(12) United States Patent
Grivei et al.

(10) Patent No.: US 9,187,612 B2
(45) Date of Patent: Nov. 17, 2015

(54) GROUND EXPANDED GRAPHITE AGGLOMERATES, METHODS OF MAKING, AND APPLICATIONS OF THE SAME

(75) Inventors: Eusebiu Grivei, La Hulpe (BE); Fabio Rota, Comano (CH); Jean-Christophe Rietsch, Charenton-le-Pont (FR); Simone Zuercher, Bellinzona (CH); Raffaele Gilardi, Bellinzona (CH); Michael Spahr, Bellinzona (CH)

(73) Assignee: Imerys Graphite & Carbon Switzerland SA, Bodio (CH)

(*) Notice: Subject to any disclaimer, the term of this patent is extended or adjusted under 35 U.S.C. 154(b) by 0 days.

(21) Appl. No.: 13/816,030

(22) PCT Filed: Aug. 11, 2011

(86) PCT No.: PCT/EP2011/063866
§ 371 (c)(1),
(2), (4) Date: Jun. 11, 2013

(87) PCT Pub. No.: WO2012/020099
PCT Pub. Date: Feb. 16, 2012

(65) Prior Publication Data
US 2013/0260150 A1    Oct. 3, 2013

Related U.S. Application Data

(60) Provisional application No. 61/372,479, filed on Aug. 11, 2010.

(30) Foreign Application Priority Data

Aug. 11, 2010    (EP) .................................. 10172468

(51) Int. Cl.
| | |
|---|---|
| C08K 3/04 | (2006.01) |
| C01B 31/04 | (2006.01) |
| H01B 1/24 | (2006.01) |
| B02C 19/00 | (2006.01) |
| H01B 1/04 | (2006.01) |

(52) U.S. Cl.
CPC .............. *C08K 3/04* (2013.01); *B02C 19/0056* (2013.01); *C01B 31/04* (2013.01); *C01B 31/0423* (2013.01); *H01B 1/04* (2013.01); *H01B 1/24* (2013.01); *Y10T 428/2982* (2015.01)

(58) Field of Classification Search
CPC ...... C08K 3/04; C01B 31/04; C01B 31/0423; H01B 1/24; H01B 1/04; B02C 19/0056; Y10T 428/2982
USPC ................... 428/402, 323; 427/212
See application file for complete search history.

(56) References Cited

U.S. PATENT DOCUMENTS

| | | | |
|---|---|---|---|
| 3,666,455 | A | 5/1972 | Olstowski |
| 3,894,882 | A | 7/1975 | Takewell et al. |
| 4,777,056 | A | 10/1988 | Buhler et al. |
| 5,030,433 | A | 7/1991 | Mehrotra |
| 6,620,359 | B1 | 9/2003 | Meza et al. |
| 7,449,030 | B2 | 11/2008 | Robson et al. |
| 2007/0031704 | A1 | 2/2007 | Guckert et al. |
| 2008/0279710 | A1* | 11/2008 | Zhamu et al. ............... 419/6 |
| 2009/0189125 | A1* | 7/2009 | Grigorian et al. ........ 252/511 |

FOREIGN PATENT DOCUMENTS

| | | |
|---|---|---|
| CH | 359662 | 1/1962 |
| CN | 101100298 A1 | 1/2008 |
| DE | 199 04 657 A1 | 8/2000 |
| DE | 100 14 749 A1 | 1/2002 |
| EP | 0 310 980 A1 | 4/1989 |
| EP | 0 469 725 A1 | 2/1992 |
| EP | 0 735 123 A1 | 10/1996 |
| EP | 0735123 * | 10/1996 |
| EP | 1 749 805 A1 | 2/2007 |
| JP | S63-147810 A | 6/1988 |
| JP | H03-007740 A | 1/1991 |
| JP | H06-100727 A | 4/1994 |
| JP | H08-188407 A | 7/1996 |
| JP | 2004-82005 A | 3/2004 |
| JP | 2006-128027 | 5/2006 |
| WO | WO 95/13864 | 5/1995 |
| WO | WO 01/03807 A1 | 1/2001 |
| WO | WO 01/33971 A1 | 5/2001 |

(Continued)

OTHER PUBLICATIONS

Johanson, J.R., "A Rolling Theory for Granular Solids", Journal of Applied Mechanics, Series E 32, Dec. 1965, pp. 842-848.
Falzone, Angela M.; Peck, Garnett E.; and McCabe, George P., "Effects of Changes in Roller Compactor Parameters on Granulations Produced by Compaction", Drug Development and Industrial Pharmacy, vol. 18, No. 4, 1992, pp. 469-489.
Drzymala, Zygmunt, "Research into the briquetting process for improved design of briquetting machines", Materials & Design, vol. 15, No. 1, 1994, pp. 33-40.

(Continued)

*Primary Examiner* — Leszek Kiliman
(74) *Attorney, Agent, or Firm* — Finnegan, Henderson, Farabow, Garrett & Dunner, L.L.P.

(57) ABSTRACT

The present disclosure relates to ground expanded graphite agglomerate compositions, methods for making such agglomerates, their use as conductive additive, and conductive composites including such ground expanded graphite agglomerates. The disclosure also pertains to methods for making such composites and the use of such composites in preparing thermally conductive materials. The agglomerates may be characterized by a certain softness allowing the agglomerates to dissolve, e.g., through shear forces applied during compounding, thereby leading to an improved feedability and a highly homogenous distribution of the expanded graphite material in the composite matrix.

31 Claims, 14 Drawing Sheets

(56) References Cited

FOREIGN PATENT DOCUMENTS

| WO | WO 01/36079 A1 | 5/2001 |
|---|---|---|
| WO | WO 2012/020099 A1 | 2/2012 |

OTHER PUBLICATIONS von Eggelkraut-Gottanka, Stephen G.; Abed, Salah Abu; Müller, Wolfgang; and Schmidt, Peter C., "Roller Compaction and Tabletting of St. John's Wort Plant Dry Extract Using a Gap Width and Force Controlled Roller Compactor. I. Granulation and Tabletting of Eight Different Extract Batches", Pharmaceutical Development and Technology, vol. 7, No. 4, 2002, pp. 433-445.

Guigon, P. and Simon, O., "Roll press design—influence of force feed systems on compaction", Powder Technology, vol. 130, 2003, pp. 41-48.

Sommer, K. and Hauser, G., "Flow and compression properties of feed solids for roll-type presses and extrusion presses", Powder Technology, vol. 130, 2003, pp. 272-276.

Grossmann, Dipl.-Ing Lilla; Tomas, Dr.-Ing. Habil. Jürgen; Herold, Dipl.-Ing. Daniela; and Sommer, Dr.-Ing. Karl, "Empirical Study of the Compaction of Cohesive Bulk Solids in a Roll Press", Aufbereitungs Technik, vol. 47, No. 6, 2006, pp. 22-29.

Teng, Yue; Qiu, Zhihui; and Wen, Hong, "Systematical approach of formulation and process development using roller compaction", European Journal of Pharmaceutics and Biopharmaceutics, vol. 73, 2009, pp. 219-229.

Reynolds, Gavin; Ingale, Rohit; Roberts, Ron; Kothari, Sanjeev; and Gururajan, Bindhu, "Practical application of roller compaction process modeling", Computers and Chemical Engineering, vol. 34, 2010, pp. 1049-1057.

International Search Report and Written Opinion issued Nov. 8, 2011, in International PCT Application No. PCT/EP2011/063866, filed Aug. 11, 2011.

Office Action issued in related Chinese Application No. 2011800459638, dated Jul. 3, 2014.

Notice of Reasons for Rejection issued in related Japanese Patent Application No. JP 2013-523626, dated Oct. 21, 2014, 5 pgs.

Office Action issued Jul. 2, 2015, by the European Patent Office for related European Patent Application No 11 741 607.3.

\* cited by examiner

C=milled expanded graphite foil (prior art); GEGA granules=ground expanded graphite agglomerates with fines removed (one embodiment of the invention), GEGA=ground expanded graphite agglomerates (one embodiment of the invention), B=primary synthetic graphite (d90~25 microns), A= carbon black, UP= ground expanded graphite (non-agglomerated)

PP=Polypropylene, C=milled expanded graphite foil (prior art); GEGA granules=ground expanded graphite agglomerates with fines removed (one embodiment of the invention), GEGA=ground expanded graphite agglomerates (one embodiment of the invention), B=primary synthetic graphite (d90~25 microns), A= carbon black, UP= ground expanded graphite (non-agglomerated)

PP=Polypropylene, C=milled expanded graphite foil (prior art); GEGA granules=ground expanded graphite agglomerates with fines removed (one embodiment of the invention), GEGA=ground expanded graphite agglomerates (one embodiment of the invention), B=primary synthetic graphite (d90~25 microns), A= carbon black, UP= ground expanded graphite (non-agglomerated)

PP=Polypropylene, C=milled expanded graphite foil (prior art); GEGA granules=ground expanded graphite agglomerates with fines removed (one embodiment of the invention), GEGA=ground expanded graphite agglomerates (one embodiment of the invention), B=primary synthetic graphite (d90~25 microns), A= carbon black, UP= ground expanded graphite (non-agglomerated)

PP=Polypropylene, C=milled expanded graphite foil (prior art); GEGA granules=ground expanded graphite agglomerates with fines removed (one embodiment of the invention), GEGA=ground expanded graphite agglomerates (one embodiment of the invention), B=primary synthetic graphite (d90~25 microns), A= carbon black, UP= ground expanded graphite (non-agglomerated)

Tap density = 0.11 g/cm³    Tap density = 0.18 g/cm³    Tap density = 0.29 g/cm³

Mat.1 (GEGA Sample 1) = ground expanded graphite agglomerates with <0.4% of hard granules (>250 μm after mechanical water flushing sieving)

Mat.2 (GEGA Sample 2) = ground expanded graphite agglomerates with 8% of hard granules (>250 μm after mechanical water flushing sieving)

Figure 15: Process for Preparing Ground Expanded Graphite Agglomerates
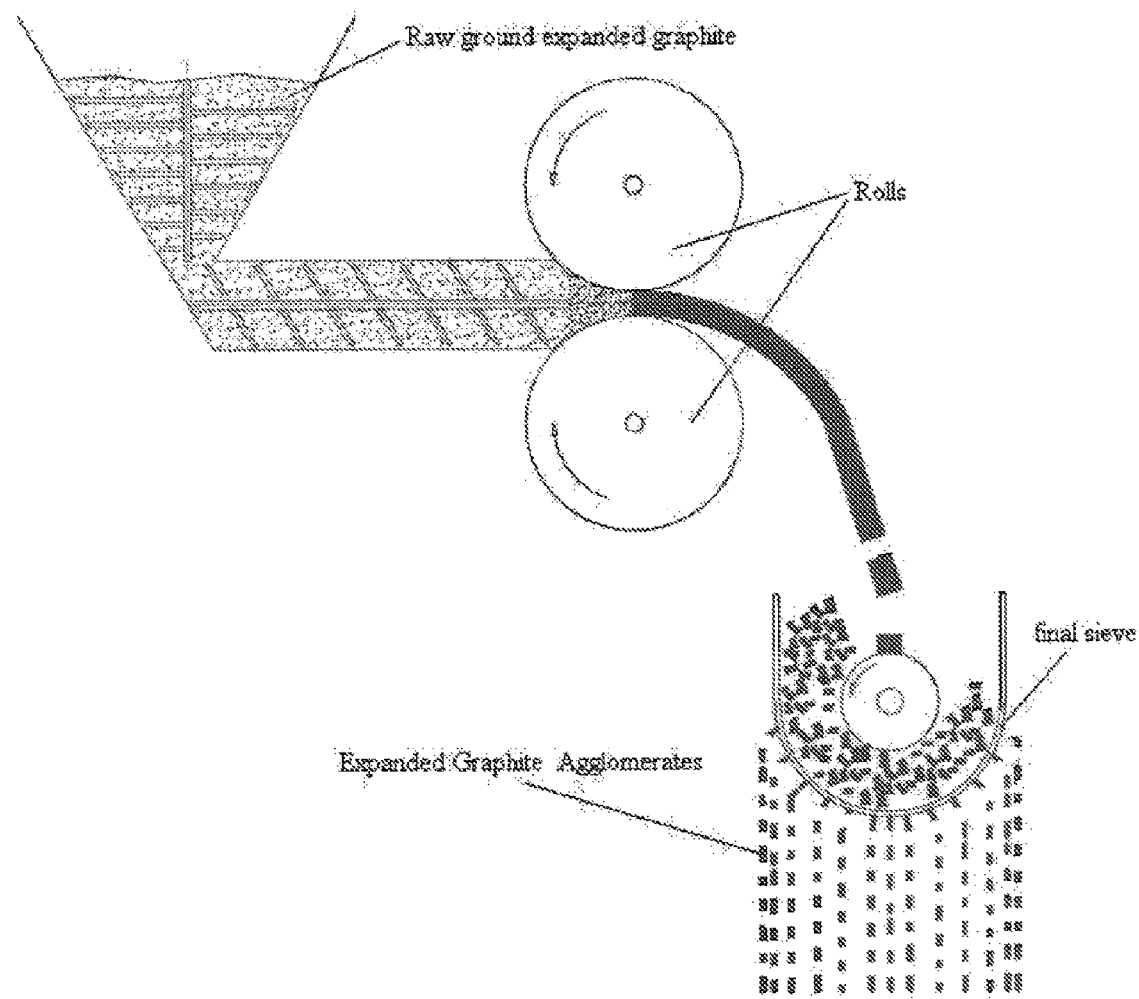

Figure 16: Vertical arrangement of the Agglomeration Process for Expanded Graphite
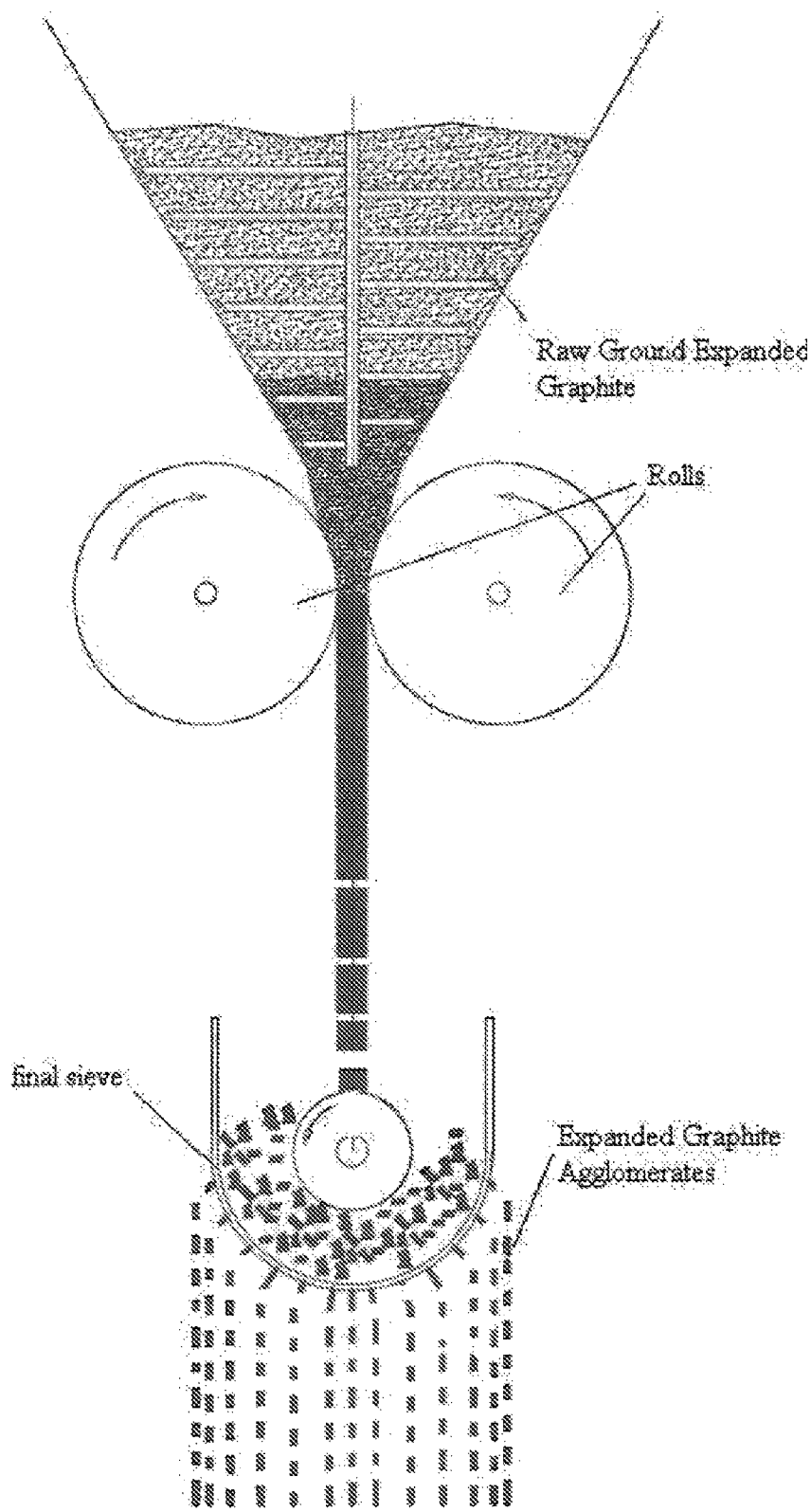

Figure 17: Flat Die Pelletizing Process
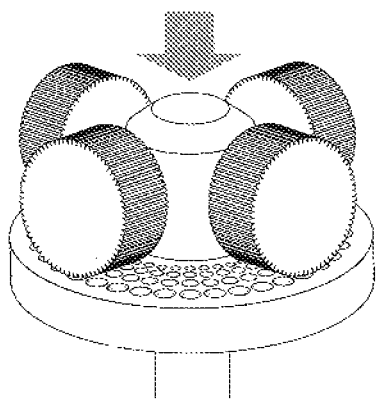
(the arrow shows where the expanded graphite is fed)
Figure 18: Rotary Drum Pelletizer
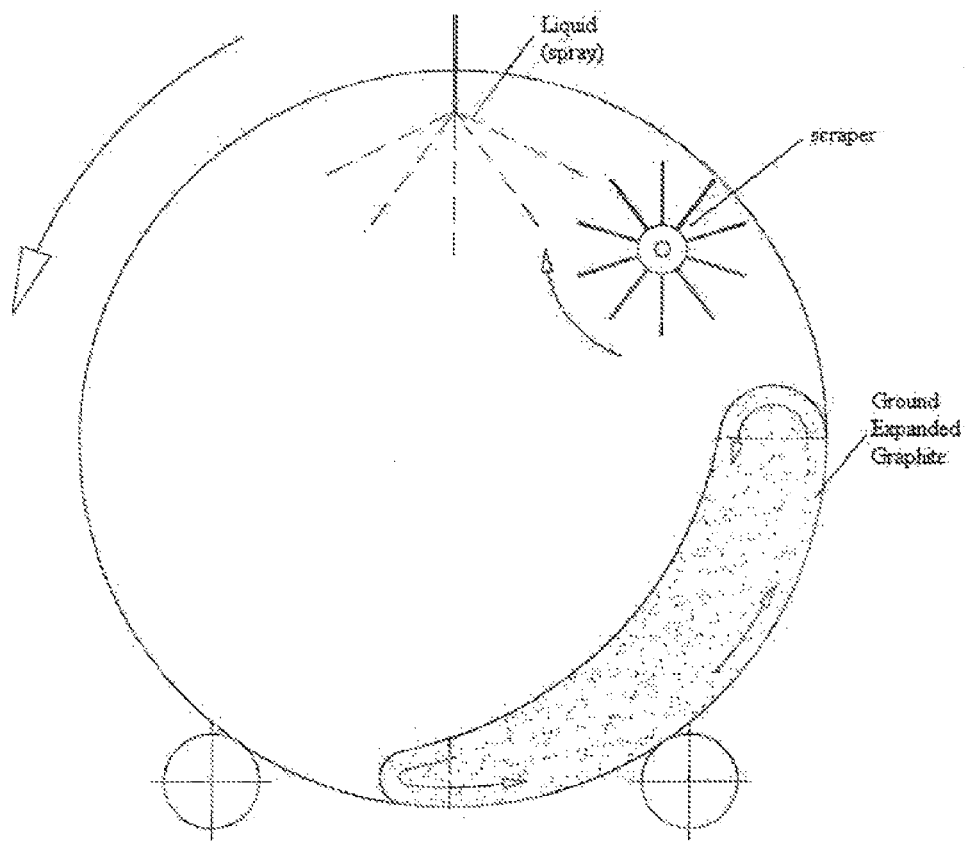

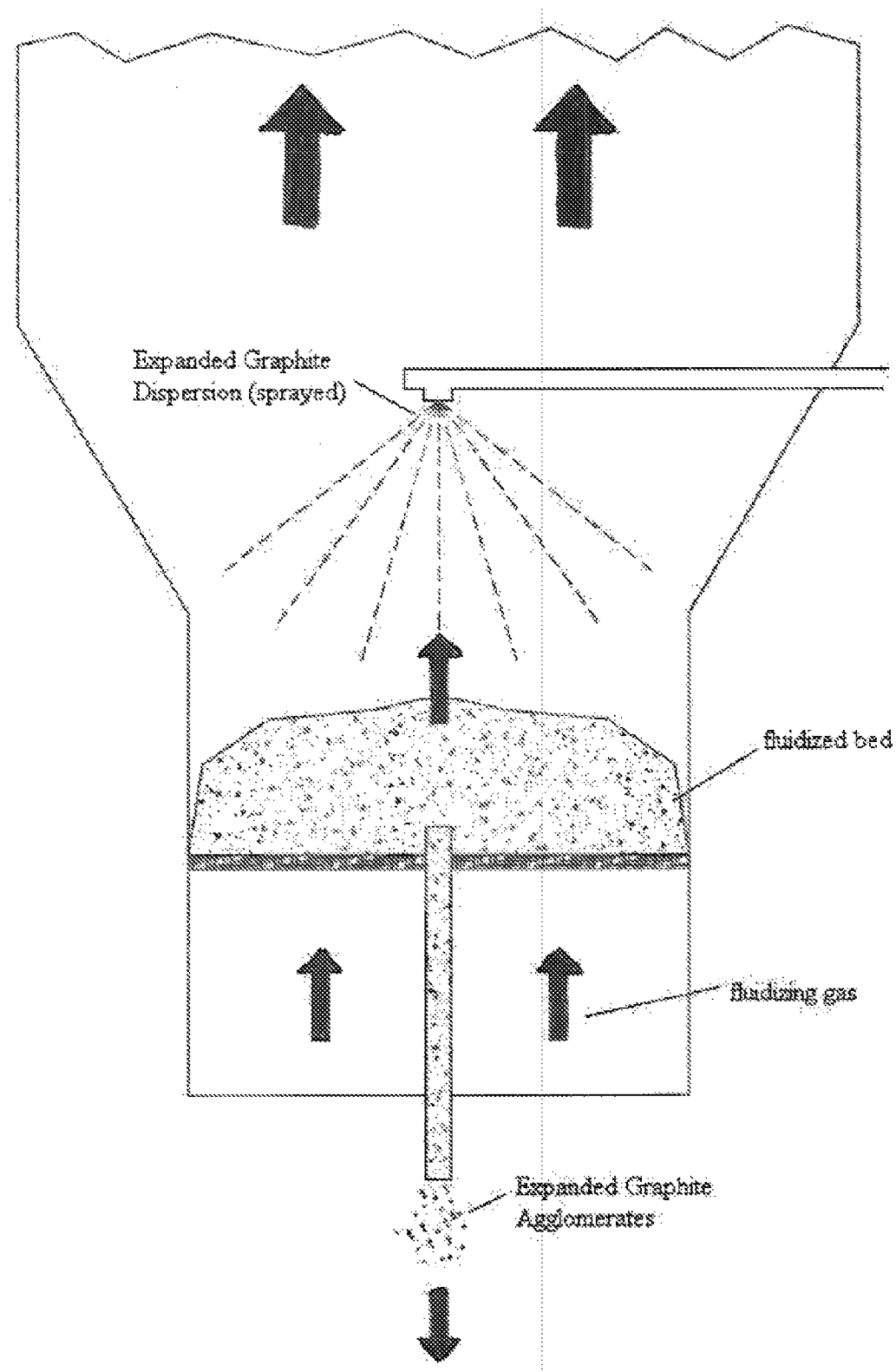
Figure 19: Fluidized Bed Spray Dryer

GROUND EXPANDED GRAPHITE AGGLOMERATES, METHODS OF MAKING, AND APPLICATIONS OF THE SAME

RELATED APPLICATIONS

This application is a U.S. national stage entry under 35 U.S.C. § 371 from PCT International Application No. PCT/EP2011/063866, filed Aug. 11, 2011, which claims priority to and the benefit of the filing date of U.S. Provisional Application No. 61/372,479, filed Aug. 11, 2010, and EP Application No. 10172468.0, filed Aug. 11, 2010, to all of which this application claims the benefit of priority, and the entireties of the subject matter of all of which is incorporated herein by reference.

FIELD OF THE DISCLOSURE

The present disclosure relates to ground expanded graphite agglomerate compositions for use as a conductive additive, methods for preparation thereof, and their use in composites such as polymer blends, ceramics, and mineral materials.

BACKGROUND

Graphite powder is a promising filler (i.e., conductive additive) for thermally and electrically conductive polymers and other composite materials.

Expanded or exfoliated graphite, also known as nanographite or nano-structured graphite, has recently attracted increased interest because of its excellent thermal and electrical conductivity properties. Expanded graphite outperforms non-expanded graphite and other conductive fillers (e.g., boron nitride, carbon fibers, carbon nanotubes) in terms of the thermal conductivity conveyed to polymers or other materials such as cement or gypsum-based materials. Adding expanded graphite to flooring materials to increase the thermal conductivity of the composite material is generally known in the art and has, for example, been described in DE-OS-100 49 230 A1.

However, disadvantages of adding expanded graphite—as opposed to conventional highly crystalline synthetic and natural graphite—to the polymer mass are its difficult workability and processability, its lower lubricating properties, its lower oxidation resistance, and its dustiness. In addition, processing expanded graphite in polymer compounders may result in flow problems that make it difficult to extrude the polymer including the expanded graphite. Problems in particular arise during the feeding of the expanded graphite into the extruder.

US 2009/0189125 to Grigorian et al. describes a process for preparing electrically conductive polymer composites comprising mixing non-predispersed carbon with an emulsion comprising a polymer in a liquid solvent to obtain a dispersion of the carbon in the polymer matrix, followed by removing the solvent from the dispersion ("solution compounding"). Grigorian et al. also describe as a comparative example a process on a laboratory scale wherein expanded graphite was mixed with dry polypropylene powders by mechanical mixing (compounding) followed by molding the mixture into composite sheets. Grigorian et al. does not describe any processability issues observed for expanded graphite, such as problems related to feeding of the expanded graphite into the extruder.

In addition, US 2007/031704 assigned to SGL Carbon describes conductive additives for gypsum materials comprised of compacted expanded graphite particles made from ground graphite foils. The expanded graphite is first compressed into large two dimensional structures (i.e. graphite foils) having a thickness of between 0.1 and 3 mm and a density between 0.8 and 1.8 g/cm$^3$ and is then chopped, in a cutting mill, into smaller particles having a diameter between 1 and 5 mm and a bulk density of typically between 0.12 and 0.25 g/cm$^3$. The resulting particles differ in their properties compared to the present invention, particularly in terms of the hardness of the particles, which is substantially higher in the particles described in US 2007/031704. In particular, the hardness of the expanded graphite particles described in US 2007/031704 has a negative effect on the thermal conductivity and on the mechanical properties of the composite product as compared to powdered expanded graphite.

EP 0 735 123 A describes processes for making graphite composite materials based on expanded graphite and used in chemical heat pumps or treatment devices for industrial gases. In the process described in EP 0 735 123 A, the expanded graphite is pre-densified into a macroscale matrix or laminate by compression or lamination. The composite compact is then further processed by impregnation and subsequent drying, followed by a final compression step to bring the graphite product into its final desired form. EP 0 735 123 A does not describe the use of the graphite as a conductive additive, e.g. for polymer products.

US 2008/0279710 A1 by Zhamu et al. describes a method of producing electrically conductive composite compositions particularly useful as fuel cell bipolar plates. The method comprises blending expandable (as opposed to expanded) graphite powder with non-expandable graphite powder and a binder, followed by expansion of the expandable graphite by heat treatment. Subsequently, the mixture is compressed into macroscale preformed composite compacts such as sheets and blocks which are then treated to activate the binder in the composition resulting in the desired composite plates that can be used in fuel cells (see, e.g., the flow chart in FIG. 2a). The patent application appears to describe the expansion of the expandable graphite portion of a mixture comprising expandable graphite, non-expandable graphite and a binder, and subsequent curing of the mixture by combined compression and binder treatments leading to composites of good mechanical integrity while exhibiting high transversal electrical conductivity. Zhamu et al. are not concerned with already expanded graphite powders, but rather prepare mixtures with binders to produce directly the desired composite compacts as the result of their process. While US 2008/0279710 A1 notes that expanded graphite is difficult to handle as concerns mixing with other powders such as non-expandable graphite, the solution presented to this problem is rather to mix the two graphite powders prior to exfoliation of the expandable graphite, thereby circumventing the problem of difficult handling due to the low density of expanded graphite.

Accordingly, it is an object of the invention to provide expanded graphite forms that preserve the excellent thermal and electrical conductivity of powdered expanded graphite while offering good processability comparable to standard, i.e. non-expanded synthetic or natural graphite. It is a further object to provide a process for preparing such advantageous expanded graphite forms and furthermore to provide composites comprising such advantageous expanded graphite forms. Finally, it is yet another object to provide applications and uses of conductive polymers comprising said advantageous expanded graphite forms.

SUMMARY

The inventors have found that expanded graphite can be ground and subsequently processed into ground expanded graphite agglomerates which are comparatively soft, i.e., the agglomerates "dissolve" (i.e., deagglomerate) into finer particles during or after their addition to a matrix material, such as a polymer, thereby producing a conductive composite material having excellent thermal (and electrical) conductivity, while preserving the composite material's mechanical stability. Moreover, the agglomerates offer better handling properties as compared to unprocessed expanded graphite, which inter alia offers easier feeding of the graphite additive to the polymer during the production of the conductive polymer.

Thus, according to a first aspect, the present invention is directed to graphite agglomerates comprising ground expanded graphite particles compacted together. Such agglomerates represent a powder (albeit with a larger particle size) that can still flow, in contrast to compacted expanded graphite particles in the form of sheets or other three dimensional composite compacts.

In other words, the graphite agglomerates of the present invention represent a particulate matter which can be characterized, for example, by its particle size distribution as determined by soft vibrating sieving according to DIN 51938. For example, certain embodiments of the ground expanded graphite agglomerates of the present invention are preferably characterized by a size distribution wherein in the analysis according to DIN 51938 from about 10 to about 80 wt % are retained on a 250 µm sieve, or from about 10 to about 60 wt % are retained on a 500 µm sieve, or from about 10 to about 30 wt % are retained on the 1 mm sieve, or less than about 5 wt % are retained on a 2 mm sieve. In addition, certain embodiments of the ground expanded graphite agglomerates of the present invention are preferably characterized by granules having a size ranging from about 100 µm to about 10 mm, or from about 200 µm to about 4 mm.

Moreover, such agglomerates may have a particle hardness/softness which allows at least a partial and preferably a substantially complete deagglomeration of the particles during the processing for preparing a conductive polymer, i.e. deagglomeration into particles having a mean particle size of well below 250 µm or even below 100 µm, which leads to a homogenous distribution of the "dissolved" expanded graphite particles within the polymer matrix. In some embodiments, the graphite agglomerates of the present invention may comprise at least one further component in particulate form, for example natural graphite, synthetic graphite, carbon black, boron nitride, aluminium nitride, carbon fibers, carbon nanofibers, carbon nanotubes, graphene, coke, silver powders, copper powders, or combinations thereof. Naturally, the agglomerates described herein do not comprise additional components acting as a binder which would counteract with the desirable particle softness of the produced agglomerates.

According to a second aspect, the present invention is directed to a method for making the ground expanded graphite agglomerates of the present invention, wherein the method comprises compacting ground expanded graphite particles together to form the ground expanded graphite agglomerates. In some embodiments, the method further includes grinding of expanded graphite material to prepare a defined starting material to be used during the compaction step for preparing the agglomerates. Optionally, the method may also include the preparation of expanded graphite from natural or synthetic graphite materials, which may be accomplished by intercalating a graphite material and subsequently thermally expanding the graphite material to form an expanded graphite material. A general process flowchart for preparing certain embodiments of the ground expanded graphite agglomerates of the present invention is shown in FIG. 1.

Hence, ground expanded graphite agglomerates obtainable by the above method are a further aspect of this invention.

Yet another aspect of the present invention is directed to the provision of a conductive polymer comprising either the ground expanded graphite agglomerates of the present invention, or comprising compacted expanded graphite particles prepared by compacting or moulding an expanded graphite material into a macroscale article (e.g., an expanded graphite foil as known in the art), and then grinding, chopping, or milling the molded expanded graphite article into particles of compacted expanded graphite having the desired size and size distribution. Suitable polymers include, but are not limited to, a polypropylene (PP), a high-density polyethylene (HDPE), a low-density polyethylene (LDPE), a linear low-density polyethylene (LLDPE), a polyamide, a polyester, a polyarylene sulfide, a polyarylene oxide, a polysulfone, a polyarylate, a polyimide, a poly(ether ketone), a polyetherimide, a polycarbonate, elastomers (e.g., synthetic and natural rubber), thermoplastic elastomers, copolymers thereof, or mixtures thereof.

Finally, a further aspect of the invention concerns the use of such conductive polymers in the preparation of thermally and electrically conductive materials which can be used in a variety of applications such as heat dissipation in LED lighting, solar panels, electronics, etc., or as heat exchanger materials in geothermic hoses, floor heating, and other related applications.

The samples used for the thermal conductivity measurements shown in FIGS. 3a and 3b, 5, 8a and 8b were prepared using a co-rotating twin-screw extruder with a side feeder. The ground expanded graphite agglomerates of the samples were produced using ground expanded graphite having substantially the same particle size. The extruded strands were chopped after cooling in water and injection moulded to make standard tensile strength specimens. Samples for thermal conductivity measurements were cut from the tensile strength specimen and measured using a Netzsch TCT 416 instrument.

Figure 9:
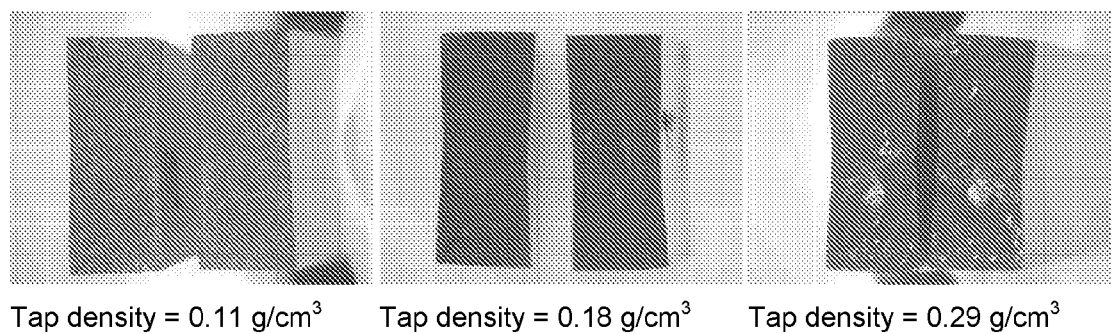

FIG. 9 shows cross-section images of broken PPH/ground expanded graphite agglomerate samples after tensile strength tests for three samples with particular embodiments of agglomerates having different tap densities. The images show that at high tap density, the agglomerates are not well dispersed in the PPH.

Figure 10:
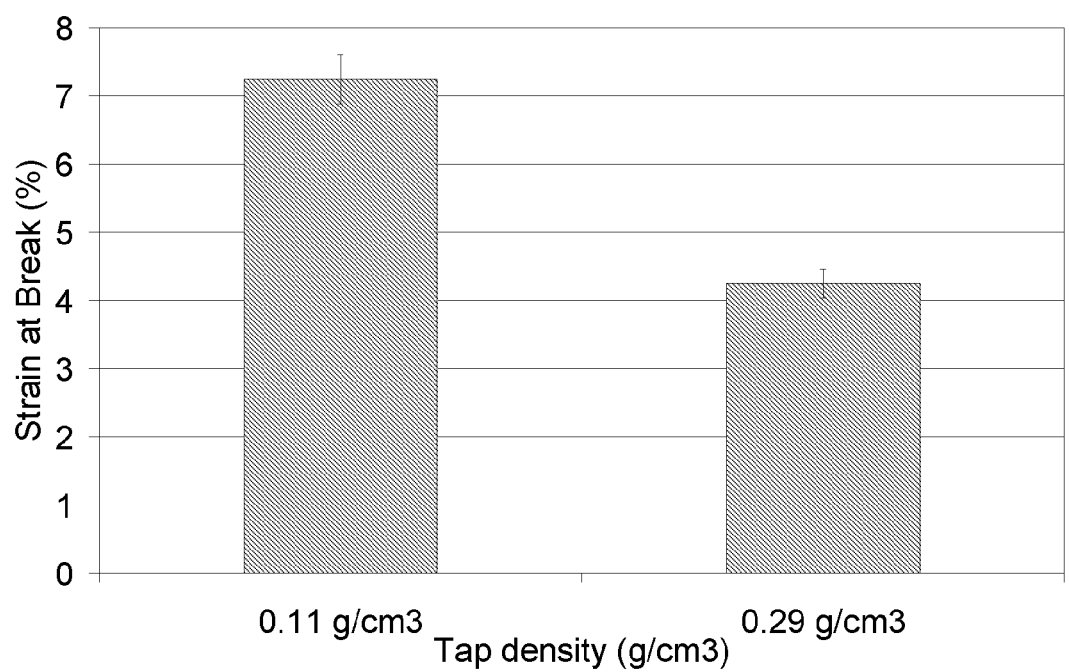

FIG. 10 shows the results of strain at break measurements for samples including 10% of particular embodiments of ground expanded graphite agglomerates (with different tap densities) in PPH. The ground expanded graphite agglomerates of both samples were produced using ground expanded graphite having substantially the same particle size (d90=53 μm).

Figure 11:
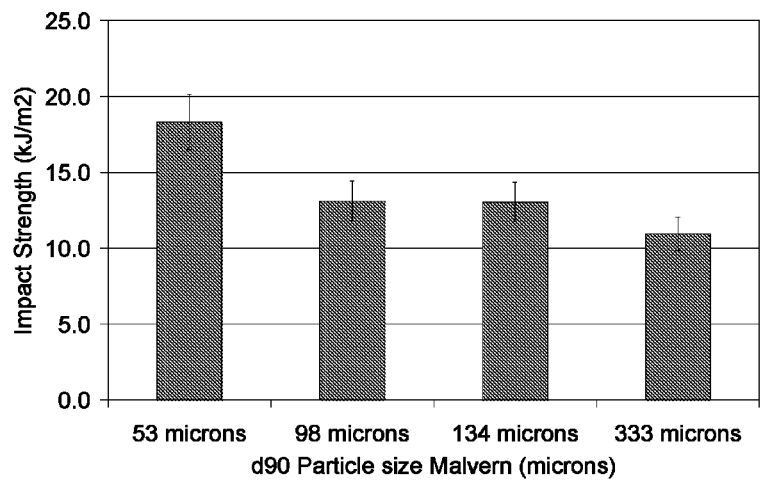

FIG. 11 depicts results of impact strength measurements for samples including 20% of particular embodiments of ground expanded graphite agglomerates produced using ground expanded graphite having different particle sizes in PPH. The tap densities of the ground expanded graphite agglomerates were similar (0.14-0.18 g/cm$^3$)

Figure 12:
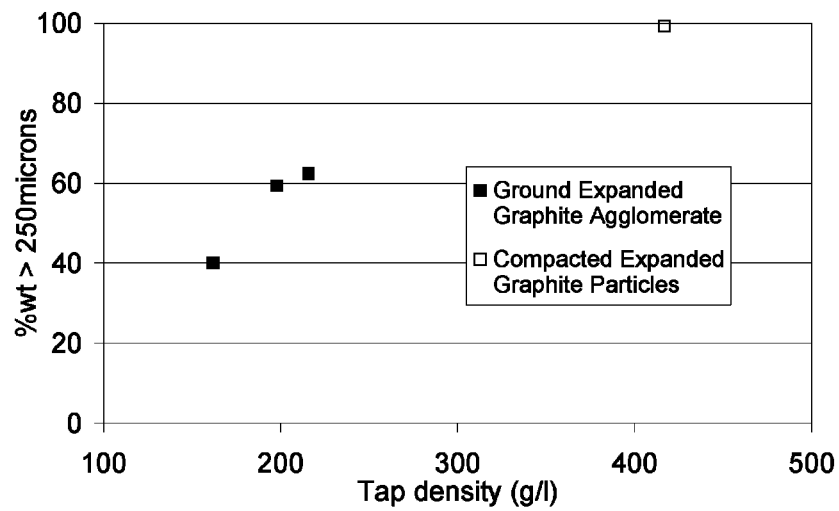

FIG. 12 shows a graphical comparison between the amount of particular embodiments of ground expanded graphite agglomerates and compacted expanded graphite particles larger than 250 μm measured by soft vibrating sieving in accordance with DIN 51938.

Figure 13:
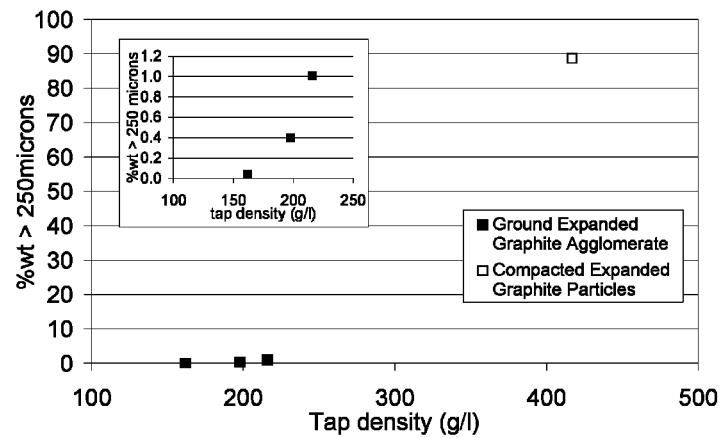

FIG. 13 shows a graphical comparison between the results of particular embodiments of ground expanded graphite agglomerates and compacted expanded graphite particles in terms of their hardness determined by mechanical water flushing sieving in accordance with EN ISO 787-18:1983.

Figure 14:
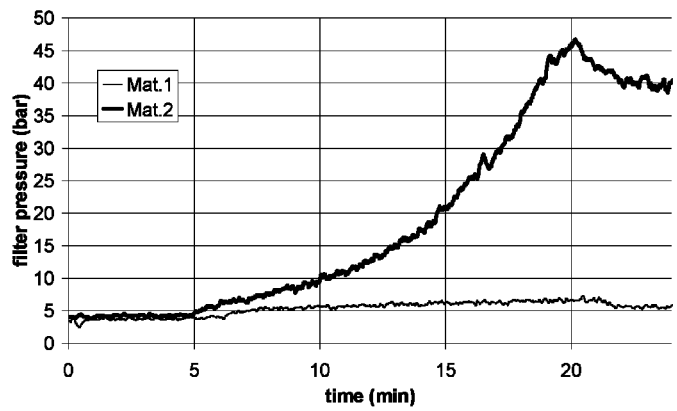

FIG. 14 illustrates the degree of dispersion in the polymer by virtue of a filter die test apparatus according to DIN EN13900-5. Ground expanded graphite agglomerates with <0.4% of hard particles (GEGA Sample 1) and ground expanded graphite agglomerates with 8% of hard granules (GEGA Sample 2) were compounded in PP (Sabic 576P) at 5% loading and extruded during 15 minutes with a filter mesh size of 150 μm.

FIGS. 15 to 19 show various setups and devices for preparing particular embodiments of ground expanded graphite agglomerates of the present invention.

DETAILED DESCRIPTION OF EXEMPLARY EMBODIMENTS OF THE INVENTION

Ground Expanded Graphite Agglomerates

Figure 1:
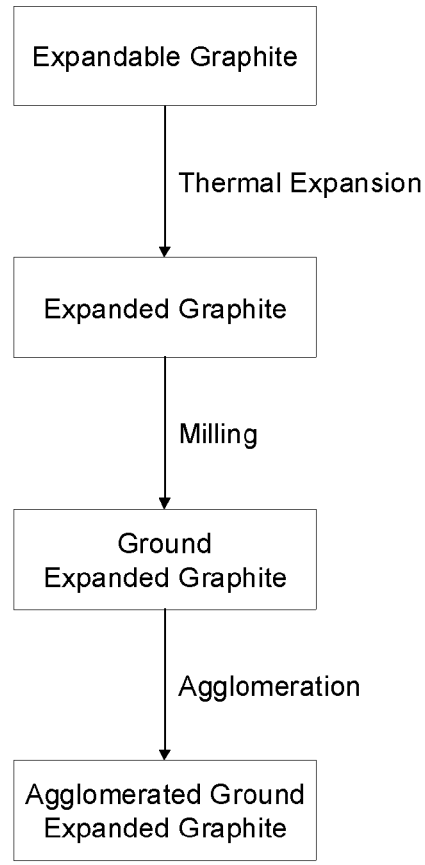
FIG. 1 depicts a general flowchart of the process for preparing particular embodiments of the ground expanded graphite agglomerates of the present invention.
Figure 2A:
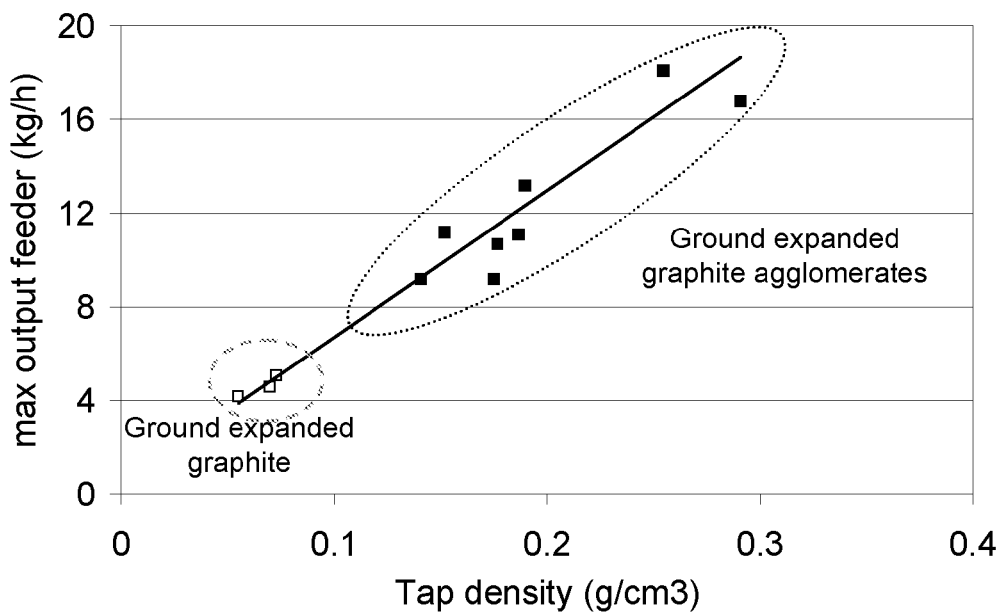
FIG. 2a demonstrates the increased feedability of the ground expanded graphite agglomerates in terms of maximal output from a Brabender FlexWall DDW-MD5-FW40 Plus-50 gravimetric dosimeter and single-screw conveyor as a function of tap density for particular embodiments of the ground expanded graphite agglomerates.
Figure 2B:
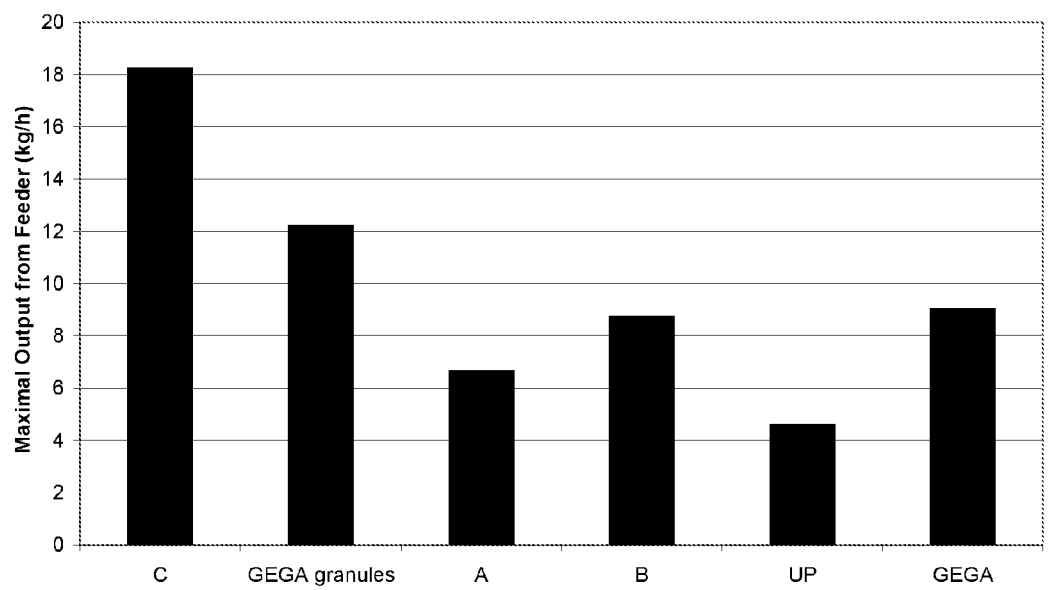
FIG. 2b compares the maximal output from the same device for the ground expanded graphite agglomerates with other materials known in the art, including a milled expanded graphite foil, standard synthetic graphite and carbon black.

Ground expanded graphite agglomerates (i.e., granulated or granular ground expanded graphite, also referred to herein as "graphite agglomerates," "agglomerates," or "granules") have been developed for use as a thermally and/or electrically conductive additive. Such agglomerates inter alia exhibit improved handling and feedability properties as compared to conventional expanded graphite, particularly when the additive is blended into a polymer, in compounders (e.g., twin-screw extruder compounders), to yield composite materials having excellent thermal and electrical conductivity as well as favourable mechanical properties (e.g., see FIGS. 2a and 2b, demonstrating advantageous feedability into extruders). The improved processing properties are provided by producing the ground expanded graphite agglomerates with an adjustable tap density such that the ground expanded graphite agglomerates are soft, medium hardness, or hard flakes that are free-flowing during their feeding into compounders and extruders.

Without wishing to be bound by a particular theory, it is believed that certain embodiments of the ground expanded graphite agglomerates of the present invention exhibit less dusting, better feedability, and better dispersion when added to matrix materials (e.g., polymers) due to the agglomerates having a low granule resistance such that they substantially or completely dissolve into the polymers upon being acted on by the shear stress of a compounder or any other suitable apparatus for facilitating the addition and mixing of the agglomerates with the matrix material. The shear stress thus dissolves the agglomerates to produce pristine expanded graphite flakes homogenously distributed in the polymer (see FIG. 2c). As used herein, "pristine expanded graphite flakes" or "pristine expanded graphite powder" refers to unagglomerated or substantially unagglomerated expanded graphite, for example, ground expanded graphite particles as described herein before their compaction to agglomerates.

In some embodiments, the ground expanded graphite agglomerates have a tap density ranging from about 0.08 to about 1.0 g/cm$^3$, preferably from about 0.08 to about 0.6 g/cm$^3$. Though higher tap density (e.g., harder flakes) generally results in improved feedability (i.e., the maximum output of the feeder, see again FIG. 2a) and higher overall productivity, high tap density may have detrimental effects on the mechanical properties of the conductive polymer. For example, a higher tap density may result in poor dispersion of the expanded graphite in the polymer matrix. Thus, in particular embodiments, the ground expanded graphite agglomerates have a medium tap density ranging from about 0.1 to about 0.4 g/cm$^3$, preferably from about 0.12 to about 0.3 g/cm$^3$ and most preferably from about 0.15 to about 0.25 g/cm$^3$ for an improved ratio between feedability and dispersion in the polymer.

It will be appreciated that in practice the ground expanded graphite might not be agglomerated in its entirety, i.e. the ground expanded graphite agglomerate product will typically contain a certain amount of non-agglomerated ("unagglomerated") particles, especially if the product is not subjected to a final sieving step which may be capable of removing smaller, non-agglomerated particles from the obtained product.

In certain embodiments, the ground expanded graphite particles forming the agglomerates have a mean particle size ($d_{50}$), measured by laser diffraction, ranging from about 5 μm to about 500 μm, preferably from about 20 μm to about 200 μm and most preferably from about 30 μm to about 100 μm. In some embodiments, the $d_{90}$ particle size, measured by laser diffraction, of the ground expanded graphite ranges from about 10 μm to about 1200 μm. In other embodiments, the $d_{90}$ particle size of the ground expanded graphite ranges from about 30 μm to about 200 μm.

In terms of particle size and distribution, certain embodiments of the ground expanded graphite agglomerates can be defined by a characteristic particle size distribution as determined by soft vibrating sieving according to DIN 51938. For example, certain embodiments of the ground expanded graphite agglomerates of the present invention are preferably characterized by a size distribution wherein in the analysis according to DIN 51938 from about 10 to about 80 wt % are retained on a 250 μm sieve, or from about 10 to about 60 wt % are retained on a 500 μm sieve, or from about 10 to about 30 wt % are retained on the 1 mm sieve, or less than about 5 wt % are retained on a 2 mm sieve.

Certain embodiments of the graphite agglomerates of the present invention have granules with a size ranging from about 100 μm to about 10 mm and preferably from about 200 μm to about 4 mm. In certain embodiments, the granule size of the agglomerates of the invention ranges from about 250 μm to about 1000 μm. Of course, depending on the circumstances, agglomerates with a different size may also be produced. In general, the agglomerate size and density of the agglomerates can be adjusted by varying certain process parameters during the compaction/granulation according to certain embodiments of the methods of the present invention as explained in more detail below.

In particular embodiments, the graphite agglomerates of the present invention have at least about 10 wt % of the agglomerates above a 250 μm Mesh sieve after soft vibrating sieving, preferably at least about 25 wt % of the agglomerates above a 250 μm Mesh sieve after soft vibrating sieving, and most preferably at least about 40 wt % of the agglomerates above a 250 μm Mesh sieve after soft vibrating sieving according to DIN 51938 (see FIG. 12).

Some embodiments of the ground expanded graphite agglomerates are characterized by a specific BET surface area ranging from about 8 m$^2$/g to about 200 m$^2$/g, and preferably from about 12 m$^2$/g to about 100 m$^2$/g, and most preferably from about 15 m$^2$/g to about 50 m$^2$/g. In still other embodiments, the ground expanded graphite agglomerates have a specific BET surface area ranging from about 20 m$^2$/g to about 30 m$^2$/g.

Certain embodiments of the ground expanded graphite agglomerates of the present invention are characterized by a particle hardness/softness which allows at least a substantial, but in most cases almost complete, deagglomeration during the processing of the agglomerates when preparing certain embodiments of the conductive polymers of the present invention. In other words, the agglomerates will "dissolve" to a large extent, or completely, into pristine expanded graphite particles once mixed into the composite polymer material.

Figure 2C:
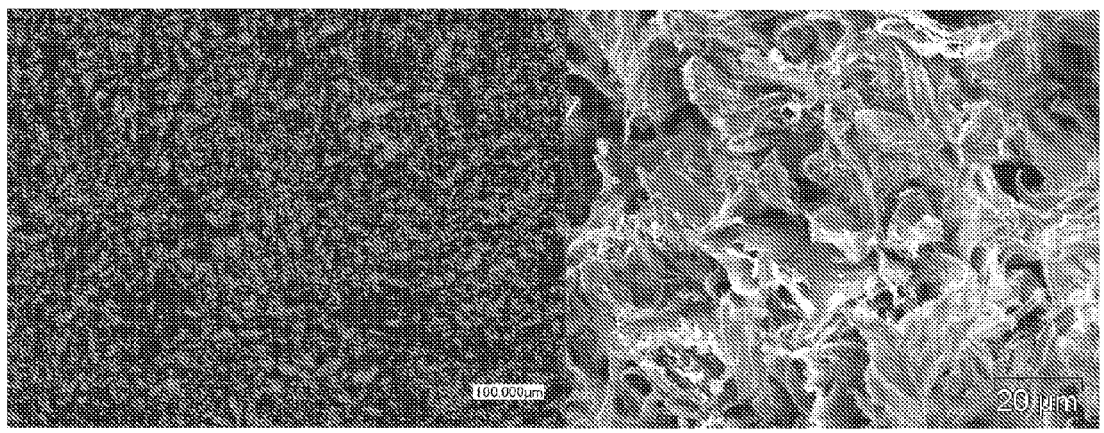
FIG. 2c shows a cross section of broken bending strength specimen. Picture on the left: Keyence VK-9700 Laserscan image of PPH-graphite compound with 25% GEGA (i.e., particular embodiments of ground expanded graphite agglomerates according to the present invention); Picture on the right: SEM picture of PPH-graphite compound with 20% UP (i.e., ground expanded graphite powder (non-agglomerated) of TIMCAL Graphite & Carbon).

Thus, in certain embodiments, it is preferred that the particle softness of the agglomerates is adjusted such that at least about 5%, 10%, 20%, 30%, 40%, 50%, 60%, 70%, 80%, 90%, 95% or 98% of the agglomerates are dissolved into particles with a mean particle size ($d_{50}$) of <250 μm during or after the feeding of the agglomerates into a composite material such as a polymer. It will be appreciated that once the graphite agglomerates are blended into the, e.g., polymer, the particle size is more difficult to determine by conventional particle size measurement methods. However, the particles can, for example, be visualized by suitable techniques such as Laserscan or SEM imaging. Such techniques allow the determination of the particle size and distribution of the expanded graphite particles in the polymer at least in a semi-quantitative manner, as illustrated in FIG. 2c.

Another way to determine the degree of dispersion in the polymer is by using a filter die test apparatus according to DIN EN13900-5, wherein the apparatus consists of a head with an additional pressure sensor and a filter holder that can be added to a twin screw extruder. Ground expanded graphite agglomerates with <0.4% of "hard granules", i.e. granules left on the sieve after the mechanical water flushing test as described herein below (GEGA Sample 1) and ground expanded graphite agglomerates with 8% of "hard granules" (GEGA Sample 2) have been compounded in PP (Sabic 576P) at 5% loading and extruded during 15 minutes with a filter mesh size of 150 μm. From the pressure vs. time graph shown in FIG. 14, it is evident that the hard particles present in GEGA Sample 2 do not disperse well during extrusion, thus leading to a high pressure, whereas GEGA Sample 1 with a low amount of hard granules doesn't lead to a significant increase of pressure in the filter. This indicates that the soft granules are easily dispersed in the polymer by the shear forces in twin-screw equipments, whereas the hard granules don't disperse well during twin-screw compounding.

In some embodiments, the particle hardness increases with increasing tap density. It has been found that for certain polymers and under particular process conditions, a tap density above about 0.4 g/cm$^3$ to about 0.6 g/cm$^3$ will no longer lead to a sufficient deagglomeration in the polymer, with the consequence that the expanded graphite distribution in the composite polymer is no longer homogenous, i.e. it results in low deagglomeration and poor dispersion of the ground expanded graphite agglomerates in the polymer, thereby forming large graphite agglomerate masses. Such embodiments have lower elongation at break (i.e., a decrease in strain at break). In certain embodiments, the tap density of the agglomerates are adjusted to not exceed about 0.3 g/cm$^3$ or even about 0.25 g/cm$^3$, although it will be appreciated that the maximum tolerated tap density depends on the particular application and process parameters applied when producing the polymer composite material.

Thus, in such embodiments, it is preferred that the particle softness of the agglomerates is adjusted such that a substantial portion of the agglomerates are dissolved into the pristine ground expanded graphite particles during the feeding of the agglomerates into a polymer such that the thermal and mechanical properties of the composite are the same or similar to composites made with ground expanded graphite.

Additional embodiments of the graphite agglomerates of the present invention can, however, also be defined by other parameters which can be determined by standard methods prior to blending the agglomerates into the polymer. One suitable test for determining the hardness of the granules is the mechanical water flushing sieving test according to EN ISO 787-18:1983 (see FIG. 13). In the test apparatus, the material to be tested is dispersed in water and brought into centrifugal motion by a system of rotating jets of water. The water flushes the fine particles through the sieve, the coarse and hard particles being retained on the sieve. The residue on the sieve is dried and weighed. Using a 250 μm Mesh size, 10 g of 250 μm graphite agglomerates to be examined, (which were previously isolated using soft vibrating sieving with a 250 μm Mesh sieve according to DIN 51938) and 10 minutes of sieving time, less than about 20% (w/w), preferably less than about 10% (w/w) or less than about 5% (w/w), and more preferably less than about 2% (w/w) of the particles with size >250 μm will be left on the sieve. In preferred embodiments of this aspect of the invention, the agglomerates have a tap density ranging from about 0.15 g/cm$^3$ to about 0.20 g/cm$^3$ wherein less than about 2%, preferably less than 1% or even less than 0.6% of the particles remain on the sieve, i.e. have a size of >250 μm as determined in the mechanical water flushing sieving test according to EN ISO 787-18:1983.

Some embodiments of the graphite agglomerates of the present invention can further be characterized by their maximum output rate in a gravimetric dosimeter, which is a parameter reflecting the feedability properties of the agglomerate material during composite polymer production. In some embodiments, the maximum output of certain embodiments of the ground expanded graphite agglomerates of the invention in a Brabender FlexWall DDW-MD5-FW40 Plus-50 gravimetric dosimeter (Brabender Technologie KG, Duisburg, Germany, http://www.brabender-technologie.com) is at least about 6 kg/h at a tap density of about 0.125 g/cm$^3$ and at least about 12 kg/h at a tap density of about 0.25 g/cm$^3$. Preferably, the maximum output is even higher, such as at least about 8 kg/h at a tap density of about 0.15 g/cm$^3$ and at least 15 kg/h at a tap density of about 0.25 g/cm$^3$ (see, e.g., FIG. 2a).

Particular embodiments of the developed ground expanded graphite agglomerates not only possess better handling and higher feedability compared to non-granular expanded graphite materials, but also provide improved properties in the conductive polymers when compared to conventional graphite additives (see, e.g., FIGS. 2b, 3b, 4, 6a and 6b, 7a and 7b). Moreover, in certain embodiments it has been observed that the thermal and electrical conductivity conferred by the addition of the expanded graphite material essentially or substantially remains the same when the agglomerates as described herein are added instead of ground expanded graphite powders in non-compacted form (see, e.g., FIGS. 8a and 8b).

In certain embodiments, the graphite agglomerates of the present invention may comprise at least one further component in particulate form. A variety of additives can be added, alone or in combination, to the ground expanded graphite material, typically prior to agglomeration. In some embodiments, additives may be mixed with the ground expanded graphite agglomerates before the mixture is added to a composite matrix material. Among the additives that can be used for these purposes are for example natural graphite, synthetic graphite, carbon black, boron nitride, aluminium nitride, carbon fibers, carbon nanofibers, carbon nanotubes, graphene, coke, silver powders, copper powders, aluminium oxide powders, steel fibers, PAN, graphite fibers, silicon carbide, graphene, or combinations thereof. The ground expanded graphite powder and the additional component can be mixed together over a broad range of different weight fractions. For example, the weight ratio may range from about 95%:5% to about 5%:95%, depending on the purpose of the resulting agglomerates and the specific requirements of the intended application.

In particular embodiments, the ground expanded graphite is mixed with the other powders (e.g. natural graphite, synthetic graphite, carbon black, boron nitride, aluminium nitride, carbon fibers, carbon nanofibers, carbon nanotubes, graphene, coke, silver powders, copper powders, etc.), and the resulting blend is then compacted in order to obtain agglomerates containing at least two different components. The advantage of such blends is the improvement of some properties of the filled matrix material. For example, agglomerate blends with carbon nanotubes, carbon black or fine graphite can improve the mechanical properties, while agglomerate blends with graphite can reduce the wear. In addition, agglomerate blends with boron nitride allow a polymer which is thermally conductive to be electrically insulating.

Methods for Making Ground Expanded Graphite Agglomerates

The ground expanded graphite agglomerates can be prepared by a variety of different processes, some of which will be described herein in more detail. In particular embodiments, these processes increase the tap density of the expanded graphite powder through the formation of larger agglomerates. At the same time, these agglomerates may be soft enough to substantially dissolve once blended into the composite matrix material, in order to convey the extraordinary performance of the pristine expanded graphite to the latter. In certain embodiments, the granulation process does not substantially change the specific BET surface area of the resulting ground expanded graphite agglomerates as compared to the expanded graphite powder, which indicates that the process does not result in partial destruction of the expanded graphite (i.e., recompaction to graphite by shear stress).

Accordingly, in another aspect the present invention provides methods for producing the ground expanded graphite agglomerates of the invention which comprise the step of compacting ground expanded graphite particles together to form the ground expanded graphite agglomerates. For instance, the ground expanded graphite may be compacted by dry mechanical compaction. Thus, the developed methods have the advantage of providing expanded graphite agglomerates or granules by dry mechanical granulation without the addition of additives. By choosing particular compaction parameters, ground expanded graphite agglomerates may be created with different tap densities consisting of soft, medium or hard flakes, thereby providing the desired properties described herein.

In some embodiments, the ground expanded graphite agglomerates formed by this compaction process may have a tap density ranging from about 0.15 g/cm$^3$ to about 0.25 g/cm$^3$. In other embodiments, the tap density ranges from about 0.12 g/cm$^3$ to about 0.3 g/cm$^3$ or from about 0.10 g/cm$^3$ to about 0.4 g/cm$^3$. In certain embodiments, the size of the ground expanded graphite agglomerates produced by the methods described herein ranges from about 0.1 mm (100 μm) to about 10 mm, although in many cases the size of the agglomerates will be from about 200 μm to about 4 mm and preferably from about 250 μm and about 1000 μm. It will be appreciated that the desired particle size and size distribution of the agglomerates can be adjusted or fine-tuned by, for example, an additional sieving step after compaction.

By performing the compacting after the grinding step, it is possible to optionally mix the ground expanded graphite with at least one other powder (e.g. natural graphite, synthetic graphite, carbon black, boron nitride, aluminium nitride, carbon fibers, carbon nanofibers, carbon nanotubes, graphene, coke, silver powders, copper powders, or combinations thereof) over a broad range of different weight fractions, and then subsequently compact the blend in order to obtain agglomerates containing different powders. The advantage of such blends is the potential improvement of certain properties of the composite. For example, agglomerate blends with carbon nanotubes, carbon black or fine graphite can improve the mechanical properties, while agglomerate blends with additional graphite can improve the lubricating properties of the polymer compound. In addition, agglomerate blends with boron nitride allow a polymer which is thermally conductive to be electrically insulating. Weight ratios can be widely varied and range for example ranging from about 95%:5% to about 5%:95% (w/w), although it may be possible or even necessary that certain additives are only added up to about 5% (w/w), or even less, such as up to about 4, about 3, about 2 or about 1% of the mass of ground expanded graphite. In some embodiments the % weight ratio (ground expanded graphite: other powder) is 90:10, 80:20, 70:30, 60:40, 50:50, 40:60, 30:70, 20:80, or 10:90.

The compaction of the ground expanded graphite material can be accomplished in a variety of different setups employing equipment generally known and used in the art for particulate matters, though not necessarily graphite. In fact, many publications and patent documents disclose suitable methods and devices for compacting materials in powder form, as described below.

J. R. Johanson, "*A rolling theory for granular solids*", Journal of Applied Mechanics Series E 32, 842-848, 1965, described a theoretical model developed on roll compaction that enables the surface pressure, torque and separating force of the rolls to be predicted from the physical characteristics of the powder and the dimensions of the rolls. A. Falzone et al., "*Effect of Changes in Roller Compactor Parameters on Granulations Produced by Compaction*", Drug Development and Industrial Pharmacy 18(4), 469-489, 1992, studied the influence of compactor parameters, roll speed, horizontal feed speed and vertical feed speed on the product characteristics. The authors found that the horizontal feed speed and the roll speed have the greatest effects on the changes in the granulation characteristics.

Z. Drzymala, "*Research into the briquetting process for improved design of briquetting machines*", Materials & Design 15(1), 33-40, 1993, discusses a mathematical model describing a roll compaction process of fine grained materials.

S. G. von Eggelkraut-Gottanka et al., "*Roller Compaction and Tabletting of St. John's Wort Plant Dry Extract Using a Gap Width and Force Controlled Roller Compactor. I. Granulation and Tabletting of Eight Different Extract Batches*", Pharmaceutical Development and Technology 7(4), 433-445, 2002, investigated the influence of compacting parameters on granule quality of a dry herbal extract. P. Guion and O. Simon, "*Roller press design—influence of force feed systems on compaction*", Powder Technology 130, 41-48, 2003 describe a variety of different roll press designs and the machine parameters are discussed with a focus on identifying the interaction between the machine parameters and the compact quality.

K. Sommer and G. Hauser, "*Flow and compression properties of feed solids for roll-type presses and extrusion presses*", Powder Technology 130, 272-276, 2003, elaborate on the theoretical background of roller compression discussing the influence of the different parameters on the product properties. L. Grossmann et al., "*Empirical Study of the Compaction of Cohesive Bulk Solids in a Roll Press*", Aufbereitungstechnik 47(6), 22-29, 2006, studied the effect of machine parameters on compaction in a roll press and examined parameters were the pressing force and the speed ratio between the feed screw and the rolls.

The review article of Y. Teng et al., "*Systematical approach of formulation and process development using roller compaction*", European Journal of Pharmaceutics and Biopharmaceutics 73, 219-229, 2009, focused on roller compaction of drugs. Relevant parameters were identified as compaction force, roll speed, and feeder screw speed. In G. Reynolds et al., "*Practical application of roller compaction process modeling*", Computers and Chemical Engineering 34, 1049-1057, 2010, the authors demonstrated the influence of the different machine parameters, roll gap, roll speed, roll pressure, screw speed on the granulate density, and the difference between the model and the observed data.

EP 0 310 980 B1 (K. Wernecke et al., Alexanderwerk AG (DE)) describes a process using a roll press for producing lumpy compacted material from finely disperse flue gas gypsum. Similarly, EP 1 230 004 (A. Eggert, Alexanderwerk AG (DE)) relates to a compacting system for bulk material which is supplied to a roller press via a feed screw. This system is also an embodiment for producing the compacted graphite agglomerate materials of certain embodiments of the present invention.

Accordingly, there is abundant knowledge in the art about agglomeration of solid materials in general, including the parameters influencing the particle properties such as particle size, shape and particle hardness. Below a number of exemplary processes and apparatuses for making the ground expanded graphite agglomerates are described in more detail.

Illustrative Examples for Making Embodiments of the Ground Expanded Graphite Agglomerates In certain embodiments, the compaction step (i.e., agglomeration) can be accomplished by a process employing a roller compactor. For example a suitable device is the Roller Compactor PP 150, manufactured by Alexanderwerk AG, Remscheid, Germany. In this process, the desired tap density is achieved by adjusting the feeding rate, the roll gap and the sieve size (see FIGS. 15 and 16, respectively, for two different setups). Preferably, the ground expanded graphite particles are fed with the help of a screw to a couple of counter-rotating rolls to yield a pre-agglomerate, followed by a fine agglomeration step whereby the pre-agglomerates are pushed through a sieve which assists in defining the desired agglomerate size.

In alternate embodiments, the agglomeration is accomplished by a process employing a flat die pelletizer, described for example in DE-OS-343 27 80 A1. In this process the tap density is adjusted by the gap between the rolls, the die and die size, and the speed of the rotating knives. Preferably, the ground expanded graphite particles are pressed through a die by pan grinder rolls, followed by cutting the pre-agglomerated graphite particles to the desired size with suitable means such as rotating knives (see FIG. 17).

In yet another alternative process embodiment, the agglomeration is achieved by a process employing a pin mixer pelletizer or a rotary drum pelletizer (cf. FIG. 18). Several patents describe these pelletizer systems for the agglomeration of different types of powders, for example U.S. Pat. No. 3,894,882, U.S. Pat. No. 5,030,433, and EP 0 223 963 B1. In these process variants, the tap density is adjusted by the feeding rate, the moisture content, the choice and concentration of the additives and the pin shaft or drum rotating speed, respectively.

In yet another alternative embodiment of the method the agglomeration is accomplished by a fluidized bed process, by a spray dryer process or by a fluidized bed spray dryer process (cf. FIG. 19).

A fluidized bed process to prepare certain embodiments of the agglomerates of the present invention may be carried out using the apparatuses described (for the agglomeration/granulation of different powders) in several patents such as DE 199 04 657 A1 and DE 100 14 749 B4. A suitable spray dryer process may utilize the apparatus described (again for the granulation of different powders) in CH 359 662, U.S. Pat.

No. 7,449,030 B2, EP 0 469 725 B1 and JP 4113746 B2. Finally, EP 1 227 732 B1, EP 0 729 383 B1 and WO 01/03807 A1 for example describe (for the granulation of different powders, not graphite) a suitable fluidized bed spray dryer that may be employed in the agglomeration processes disclosed herein.

Exemplary processes are described in more detail in the Example section below.

In some embodiments of this aspect of the invention the method for preparing particular embodiments of the agglomerates of the invention further comprises the grinding of an expanded graphite material in order to form ground expanded graphite particles which can subsequently be used in the compaction/agglomeration step. Such embodiments of the method start with the provision of expanded graphite which is then ground or milled to the desired particle size distribution.

In certain embodiments, the expanded graphite may be air milled, autogenously milled, or mechanically milled. In particular embodiments, the grinding of the expanded graphite delaminates at least a portion of the expanded graphite or destroys the vermicular morphology of the expanded graphite, or a combination thereof. In some embodiments, the expanded graphite may be ground to have a mean particle size ($d_{50}$) ranging from about 5 μm to about 500 μm, though in many cases the $d_{50}$ will range from about 20 μm to about 200 μm or even range from about 30 μm and about 100 μm or about 20 μm to about 50 μm. In some embodiments, the $d_{90}$ particle size of the ground expanded graphite ranges from about 10 μm to about 1200 μm. In other embodiments, the $d_{90}$ particle size of the ground expanded graphite ranges from about 20 μm to about 500 μm or from 30 μm to about 200 μm.

In other embodiments of this aspect of the invention, the method further comprises the preparation of the expanded graphite from natural or synthetic graphite materials by any suitable method known in the art. For instance, natural purified graphite flakes are treated, optionally by vacuum impregnation, for example with mixtures of acid (like for example $H_2SO_4$ or $HNO_3$) and an oxidation agent (e.g., hydrogen peroxide, $H_2O_2$, or an ammonium sulfate compound such as ammonium peroxodisulfate, $NH_4S_2O_8$ or potassium permanganate, $KMnO_4$), until these compounds become soaked between the graphite layers and become intercalated within the graphite sheets of the graphite crystal structure. After filtering and washing the intercalated graphite, the acid-treated graphite is heated at temperatures above the decomposition temperature of the intercalated compounds, which is generally at temperatures above about 600 to about 700° C., and preferably at about 1000° C., under inert or reducing gas atmosphere, to obtain the expanded or exfoliated graphite material.

In some embodiments, a thermally expanded graphite in its vermicular form is used. The expressions "thermally expanded graphite in its vermicular form" or "vermicular expanded graphite" as used herein, refers to the expanded graphite form as obtained directly after thermal expansion in a vermicular form morphology. In particular, it means that the vermicular expanded graphite is in its native form as obtained directly after thermal expansion. Thermally expanded graphite, as expanded sufficiently in its crystalline c-axis, of its initial z-dimension, has a vermicular morphology, i.e. an accordion-like or worm-like structure.

It should be mentioned that neither particle size nor particle shape indicate the presence of graphite in a vermicular morphology. It is the texture of the expanded graphite which clearly identifies the vermicular morphology. The determination of the particle size distribution by laser diffraction in the case of highly anisotropic materials like expanded vermicular graphite leads to high deviations from the real particle sizes since the method is based on spherical-shaped particle. The vermicular form of expanded graphite can be identified by the degree of expansion of the raw graphite material in the crystallographic c-direction which is perpendicular to the graphene layers. The thermal expansion results in a significant increase of the z-dimension of the graphite particle which is perpendicular to the graphite particle plane. Usually this expansion in the crystallographic c-direction giving the accordion-like morphology of the vermicular form causes a significant decrease of the tap density as well as a significant increase of the specific BET surface area.

In some embodiments, the initial particle expansion degree to form the vermicular morphology may be at least 80 times of the z-dimension of the non-expanded graphite flake. In other embodiments, the initial expansion degree of the expanded graphite flake in z-direction is within the range of 200 to 500 times of its initial z-dimension.

Additives for Composite Materials Such as Conductive Polymers

Ground Expanded Graphite Agglomerate Additive

The ground expanded graphite agglomerates as described herein may be used as an additive for producing composites such as conductive polymers, ceramics, mineral materials, or building materials. Conductive polymers including ground expanded graphite agglomerates can be produced with less feedability problems (i.e., yielding high productivity) and with suitable thermal and electrical conductivities for a variety of applications.

Compacted Expanded Graphite Particle Additive

In alternate embodiments, additives for preparing conductive polymers are provided which contain compacted expanded graphite particles.

The compacted expanded graphite particles of the conductive polymer additive may be prepared by providing expanded graphite, compacting or moulding the expanded graphite into a macroscale article (e.g., an expanded graphite foil as known in the art), and then grinding, chopping, or milling the molded expanded graphite article into particles of compacted expanded graphite.

Hence, the difference between such "compacted expanded graphite particles" and "ground expanded graphite agglomerates" is not only manifested in the different tap density (usually larger for "compacted expanded graphite particles") but also in the hardness of the two materials, with the "ground expanded graphite agglomerates" being softer.

The amount of each material that is larger than 250 μm can be determined by soft vibrating sieving according to DIN 51938 (cf. FIG. 12): the material obtained by grinding a foil of expanded graphite mostly consists of material larger than 250 μm, whereas material obtained by compaction of ground expanded graphite has a lower amount of agglomerates larger than 250 μm (though generally increasing with increasing tap density). In some embodiments, mechanical water flushing sieving of ground expanded graphite agglomerates (which have a size larger than 250 μm as obtained by the soft vibrating sieving) results in less than about 5 wt % of the agglomerates being retained on a 250 μm sieve, indicating the softness of the granular graphite "dissolving" into smaller particles in this test. In contrast, for some embodiments of the compacted expanded graphite particles subjected to the mechanical water flushing sieving (i.e., chopped foils having a size larger than 250 μm as obtained by the soft vibrating sieving) more than about 80 wt % are retained on the 250 μm sieve, due to their hardness. Generally, the size of the compacted expanded graphite particles is similar to the one observed for the graphite agglomerates of the present invention. Thus, the size of the particles may range from about 0.1 mm (100 μm) to about 10 mm, although in most cases the size of the agglomerates will be from about 200 μm to about 4 mm or from about 250 μm to about 1000 μm.

Composite Materials

The present invention also provides composite materials comprising certain embodiments of the ground expanded graphite agglomerates or the conductive polymer additives as described herein.

In some embodiments, the composite includes a matrix material comprising a polymeric material, a ceramic material, a mineral material, a wax, or a building material. In particular embodiments, these composites may be used in preparing thermally and/or electrically conductive materials. Exemplary materials comprise, for example, LED lighting materials, solar panels, electronics (which aid in heat dissipation) or geothermic hoses, floor heating wherein the conductive polymer acts as a heat exchanger, in heat exchangers in general (e.g., for automotive applications), thermal storage systems based on salts (e.g., phase-change materials or low melting salts), thermally conductive ceramics, friction materials for brake pads, cement, gypsum, or clay (e.g., brick for construction), thermostats, graphite bipolar plates, or carbon brushes. Suitable polymeric materials for use in conductive polymers include, for example, a polyolefin (e.g., polyethylene such as LDPE, LLDPE, VLDPE, HDPE, polypropylene such as homopolymer (PPH) or copolymers, PVC, or PS), a polyamide (e.g., PA6, PA6,6; PA12; PA6,10; PA11, aromatic polyamides), a polyester (e.g., PET, PBT, PC), an acrylic or acetate (e.g., ABS, SAN, PMMA, EVA), a polyimide, a thio/ether polymer (e.g., PPO, PPS, PES, PEEK), an elastomer (natural or synthetic rubber), a thermoplastic elastomer (e.g.: TPE, TPO), thermosetting resins (e.g., phenolic resins or epoxy resins), copolymers thereof, or mixtures of any of the foregoing materials.

The loading ratio of the ground expanded graphite agglomerates in general may vary widely, depending on the desired target value for the thermal conductivity and the requirements in terms of the mechanical stability of the composite polymer. In some embodiments, good results have already been achieved with additions of about 3 to about 5% (w/w), although in most applications the weight ratio of the added graphite may be a little higher, such as about 10, about 15, about 20, about 25 or about 30% (w/w). However, it is not excluded that in other embodiments the conductive polymers contain even more than about 30% of the expanded graphite, such as about 40, about 50, about 60 or even about 70% (w/w). In some embodiments of conductive polymer composites, like carbon brushes or bipolar plates, even about 80% (w/w) or about 90% (w/w) loading of the graphite agglomerates is used.

In any event, should electrical conductivity of the polymer also be desired, the concentration of the graphite in the final polymer may be adjusted to exceed the so-called percolation threshold ratio, above which the resistivity of the polymer typically decreases exponentially. On the other hand, it should be taken into account that the melt flow index of the composite material strongly decreases with increasing graphite content in the polymer. Thus, the graphite content in the composite polymer blend also depends on the maximal viscosity tolerated in the moulding process. The melt flow index may be, however, also dependent on the choice of the polymer type.

Figure 3A:
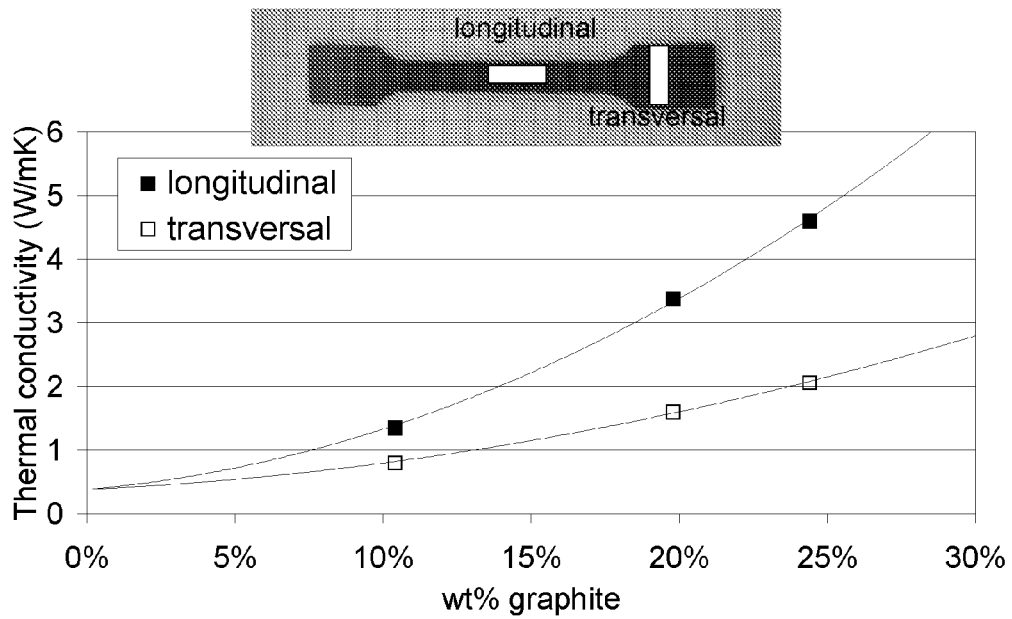
FIG. 3a shows the longitudinal and transversal thermal conductivity of polypropylene homopolymer (PPH, Sabic PP576P) samples comprising particular embodiments of ground expanded graphite agglomerates as a function of carbon content.
Figure 3B:
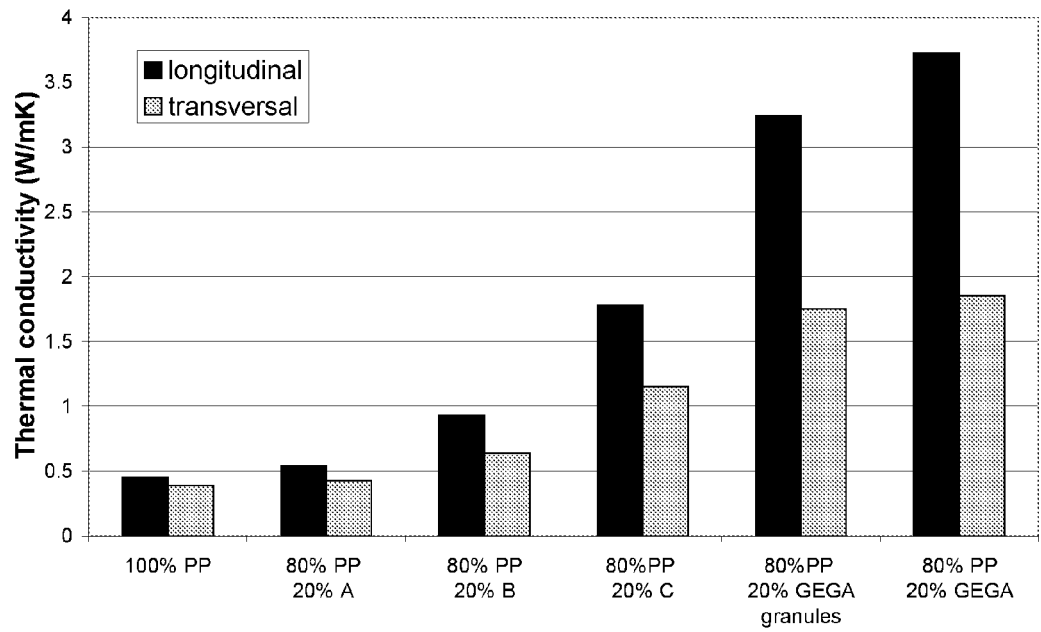
FIG. 3b again compares the longitudinal and transversal thermal conductivity of samples containing 20 wt % of the ground expanded graphite agglomerates with samples containing 20 wt % of a milled expanded graphite foil, standard synthetic graphite, carbon black and no additive at all (100% PP).
Figure 4:
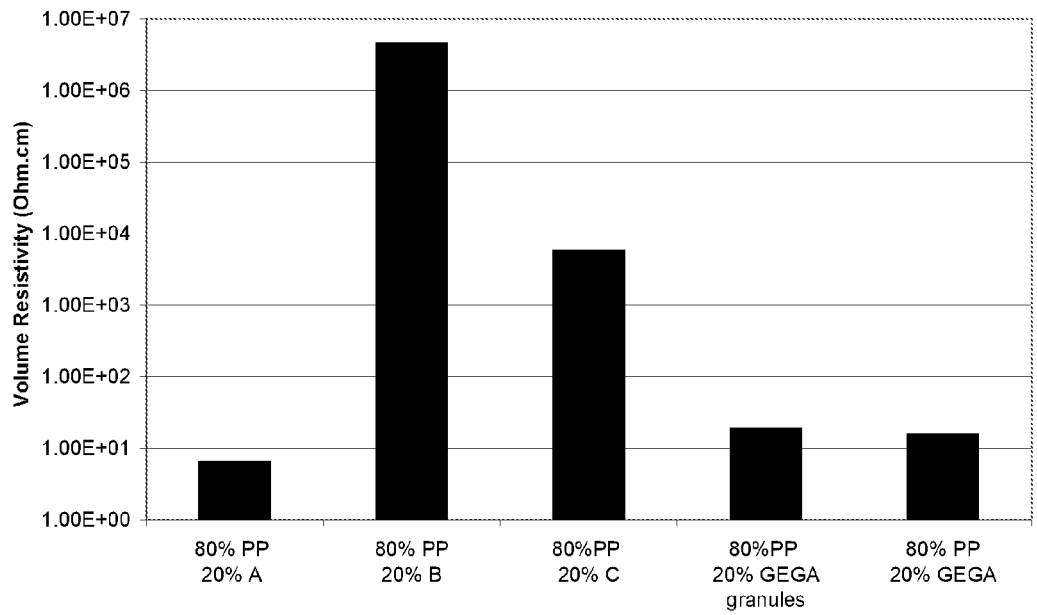
FIG. 4 compares the volume resistivity determined by the four points contact method according to DIN 51911 of polypropylene homopolymer (PPH, Sabic PP576P) samples containing 20 wt % of ground expanded graphite agglomerates with samples containing 20 wt % of a milled expanded graphite foil, standard synthetic graphite, and carbon black.
Figure 5:
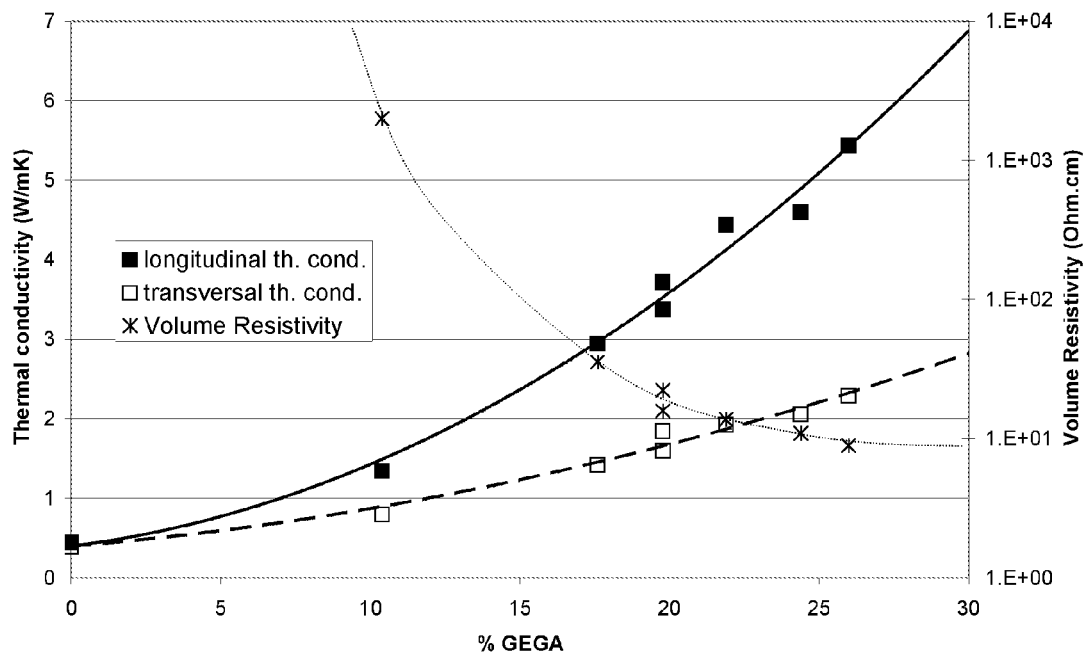
FIG. 5 depicts the thermal conductivity and volume resistivity determined by the four points contact method according to DIN 51911 for the conductive polypropylene homopolymer as a function of the content (by weight) of the ground expanded graphite agglomerates according to certain embodiments of the invention.
Figure 6A:
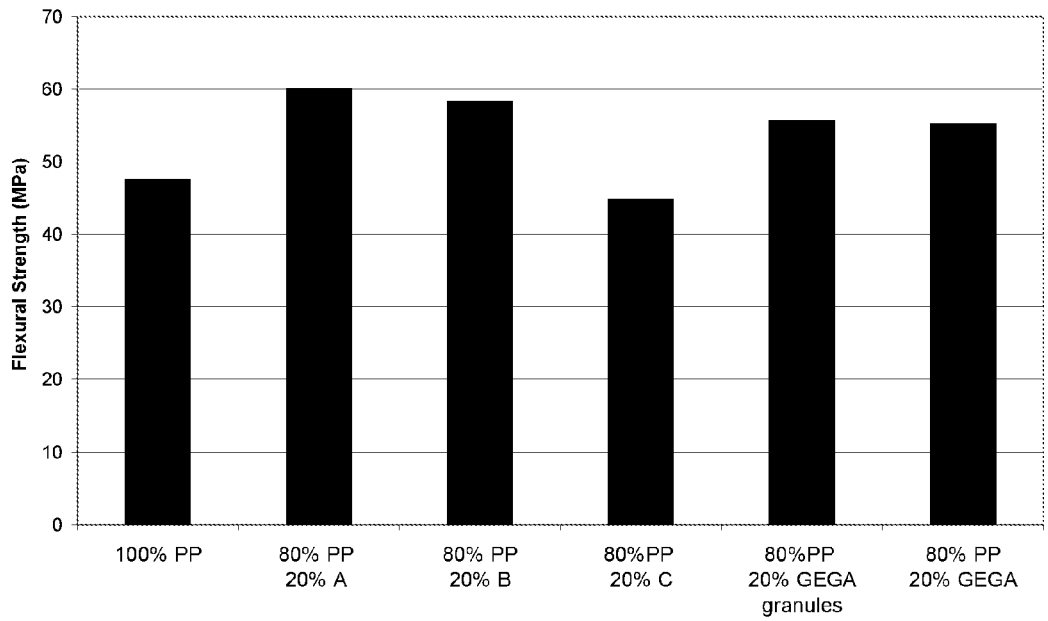
FIGS. 6a and 6b illustrate the flexural strength and flexural modulus (ISO 178) for polypropylene homopolymer (PPH, Sabic PP576P) samples comprising 20 wt % of ground expanded graphite agglomerates, milled expanded graphite foil, standard synthetic graphite, carbon black, and no carbon additive, respectively.
Figure 6B:
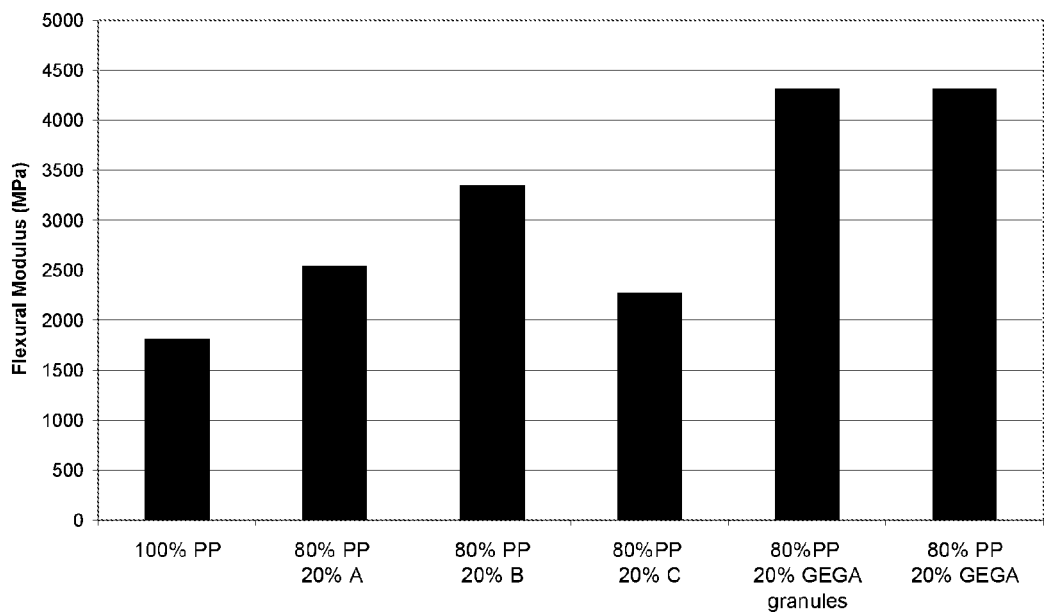
Figure 7A:
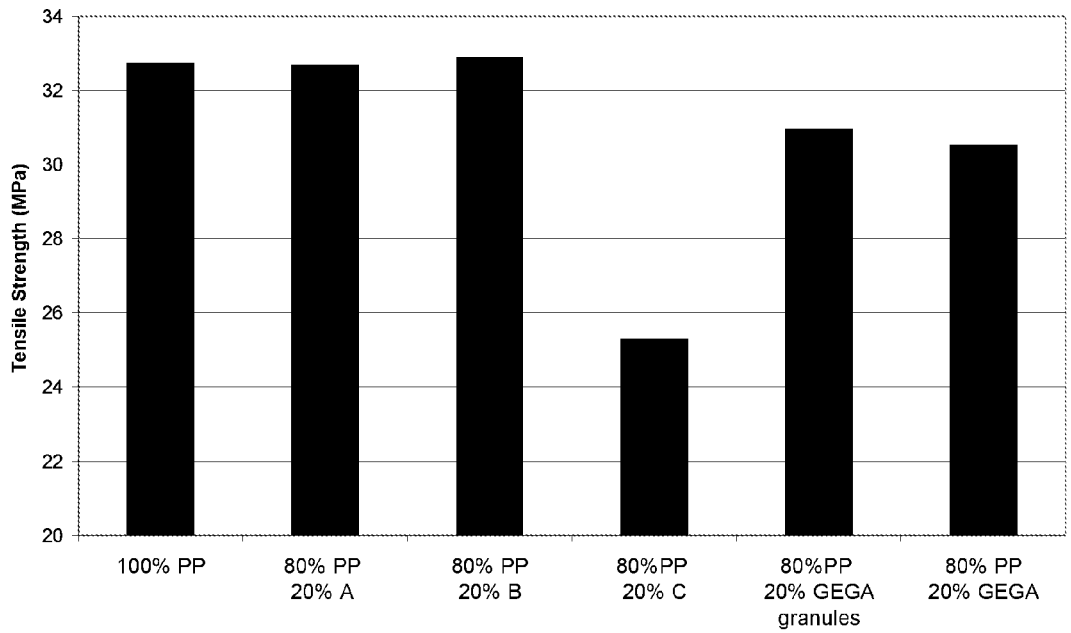
FIGS. 7a and 7b show data for the tensile strength and tensile modulus (ISO 527) obtained for polypropylene homopolymer (PPH, Sabic PP576P) samples comprising 20 wt % of ground expanded graphite agglomerates, milled expanded graphite foil, standard synthetic graphite, carbon black, and no carbon additive, respectively.
Figure 7B:
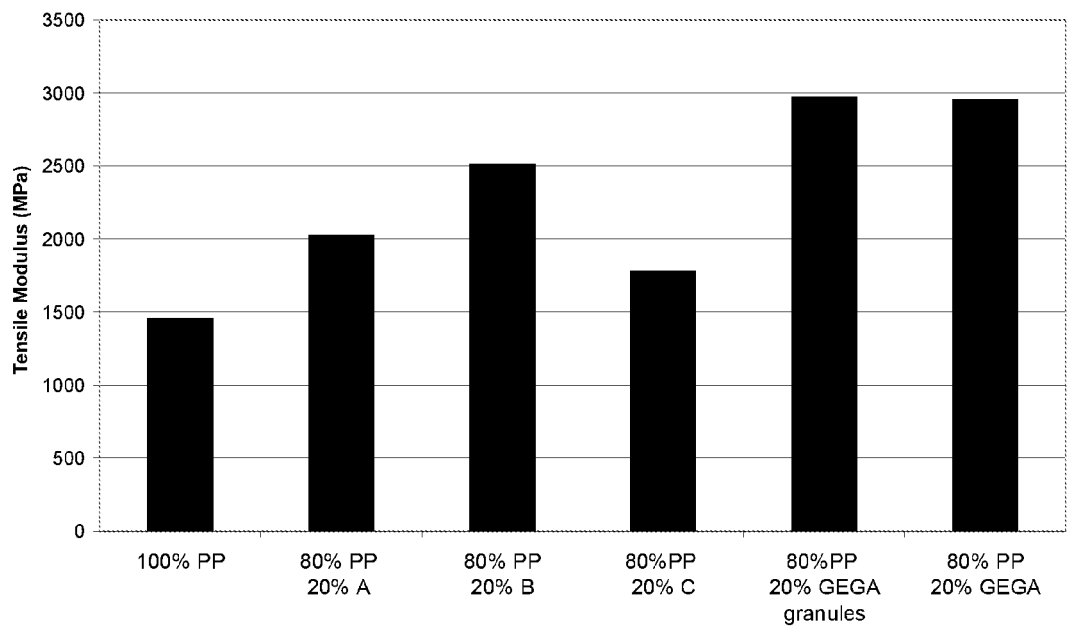

In certain embodiments, the ground expanded graphite agglomerates of the present invention may for instance be used as a thermally conductive additive in a polypropylene homopolymer (PPH), as shown in FIG. 3a. The low thermal conductivity of pure ("virgin") PPH (about 0.4 W/m*K) can be increased by one order of magnitude at a relatively low filling level (about 3.5 W/m*K) at about 20% (w/w) loading with the ground expanded graphite agglomerates. The transversal thermal conductivity is about the half of the longitudinal thermal conductivity. These results indicate that the anisotropy of the expanded graphite particles is manifested in the final compound, due to their alignment during the injection moulding process. This property should be taken into account when designing materials employing certain embodiments of the conductive polymers described herein and can even be used to fine tune the final thermal conductivity. Of course, the thermal conductivity strongly depends not only on the sample orientation (direction) during the measurement, but also on the type of polymer, the sample history (type and conditions of compounding and processing) and the measurement method.

Figure 8A:
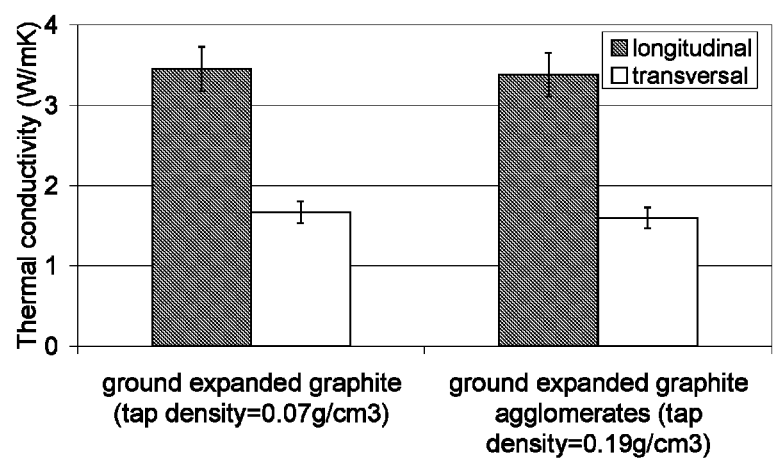
FIGS. 8a and 8b illustrate the longitudinal and transversal thermal conductivities as well as the mechanical properties (flexural strength) for samples including 20% of ground expanded graphite powder as compared to particular embodiments of ground expanded graphite agglomerates in PPH.
Figure 8B:
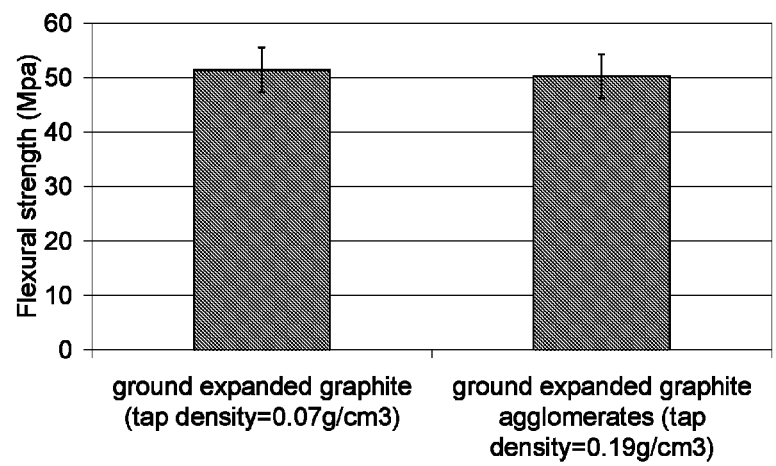

Notably, the improved feedability and handling of the ground expanded graphite agglomerates may be achieved without sacrificing the thermal performance of the expanded graphite as well as the mechanical properties of the polymer compound—i.e. the thermal conductivity obtained for the polymer blend is essentially or substantially identical, regardless of whether a graphite powder or agglomerated ground expanded graphite is used. As shown in FIGS. 8a and 8b, the thermal conductivity and the mechanical properties of polymer blends containing 20% (w/w) of ground expanded graphite and ground expanded graphite agglomerates is indeed comparable.

With regard to the mechanical properties of the conductive polymer, it has been observed that in some cases, the conductive polymer's elastic modulus, tensile and bending strength increase as the concentration of ground expanded graphite agglomerates increases. In other cases, the conductive polymer's strain at break and impact strength decrease as the concentration of ground expanded graphite agglomerates increases. In still other embodiments, the conductive polymer's E-modulus and strain at break decrease with an increase in the tap density of the ground expanded graphite. For instance, if the compacted expanded graphite agglomerates are too hard, they cannot dissolve completely in the polymer and may adversely affect the polymer's mechanical and/or conductive properties (see FIGS. 9 and 10).

In other embodiments, the impact strength increases with a decrease in the particle size distribution of the pristine expanded graphite, thus providing stronger mechanical properties in the conductive polymer (cf. FIG. 11).

Since ground expanded graphite agglomerates enable a targeted value of thermal conductivity to be reached at a lower loading compared to non-expanded graphite, it enables maintaining fairly good mechanical and rheological properties of the composite polymer.

Method for Preparing Conductive Polymers

The present invention also provides a method for making certain embodiments of the conductive polymers of the present invention. The method comprises feeding the ground expanded graphite agglomerates or the conductive polymer additive as described herein to a compounding machine (such as a twin-screw extruder, a single-screw extruder, a co-kneader, an internal mixer or long continuous mixers), thereby mixing the polymer and agglomerates, followed by a moulding process (e.g., injection moulding, compression moulding, injection compression moulding, extrusion, film blowing, thermoforming, casting, extrusion blow moulding, injection blow moulding, spinning, RIM, RTM, pultrusion, induction, emulsion, transfer injection, rotating blow moulding, transfer moulding, injection transfer moulding, calendaring or foaming) of the resulting conductive polymer into the desired form.

Uses of the Conductive Polymers

Finally, the present invention also relates to the use of particular embodiments of the conductive polymers of the present invention in preparing thermally and/or electrically conductive polymer materials. Exemplary materials comprise, for example, LED lighting materials, solar panels, electronics (aiding in heat dissipation and for covers), geothermic hoses, generally where the conductive polymer acts as a heat exchanger (e.g., floor heating applications, heat exchangers in automotive applications, heat sinks), gaskets and thermal interfaces, encapsulating devices, under-the-hood automotive parts, encapsulation of motors, ventilation parts, battery cases for electric vehicles, friction materials for brake pads (e.g., based on resins), thermostats, graphite bipolar plates, or carbon brushes (e.g., based on polymers such as thermoplastic resins, or thermosetting resins).

Compared to metal based materials conventionally used for applications where thermal conductivity is required, advantages of conductive plastics include increased freedom in the design of the materials, lighter weight materials, and cost savings compared to the normally quite expensive metal based materials.

Measurement Methods

The percentage (%) values specified herein are by weight, unless specified otherwise.

Specific BET Surface Area

The method is based on the registration of the absorption isotherm of liquid nitrogen in the range p/p0=0.04-0.26, at 77 K. Following the procedure proposed by Brunauer, Emmet and Teller (Adsorption of Gases in Multimolecular Layers, *J. Am. Chem. Soc.*, 1938, 60, 309-319), the monolayer capacity can be determined. On the basis of the cross-sectional area of the nitrogen molecule, the monolayer capacity and the weight of sample, the specific surface can then be calculated.

Tap Density 100 g of dry graphite powder is carefully poured into a graduated cylinder. Subsequently, the cylinder is fixed on the off-centre shaft-based tapping machine and 1500 strokes are run. The reading of the volume is taken and the tap density is calculated. Reference: -DIN-ISO 787-11

Particle Size Distribution by Laser Diffraction

The presence of particles within a coherent light beam causes diffraction. The dimensions of the diffraction pattern are correlated with the particle size. A parallel beam from a low-power laser lights up a cell which contains the sample suspended in water. The beam leaving the cell is focused by an optical system. The distribution of the light energy in the focal plane of the system is then analyzed. The electrical signals provided by the optical detectors are transformed into particle size distribution by means of a calculator. A small sample of graphite is mixed with a few drops of wetting agent and a small amount of water. The sample prepared in the described manner is introduced in the storage vessel of the apparatus and measured.

References: -ISO 13320-1/-ISO 14887

Particle Size Distribution by Soft Vibration Sieving

In general, a set of circular sieves with descending mesh size is assembled and fixed on a vibration machine. 50 g of dry powder is poured onto the top (=lowest mesh No.) screen. The set is vibrated for a certain time and the residue on the screens and in the bottom pan is weighed and particle size distribution is calculated. For the determination of the particle size of the agglomerates of the present invention by soft vibration sieving, an analytical sieve shaker Retsch© AS200 with one 250 μm sieve (60 mesh) was used. The settings were 1.03 of amplitude, duration 5 min, a break (called interval) every 13 seconds, and each test was carried out with 50 g of ground expanded graphite agglomerates.

References: DIN 51938

Mechanical Water Flushing Sieving

In the test method, in accordance with DIN EN ISO 787-18:1983, 10 g of the agglomerates (residue on the 250 μm sieve from soft vibrating sieving) dispersed in water are brought into circular movement by a water jet (with a pressure of 300±20 kPa) rotor which is situated inside the vessel. The fine materials are separated from the coarse material by the water and the fine particles are flushed through a sieve for at least 10 minutes in order to break the agglomerates. The sieve residue is dried at 105±2° C. for 1 h, the sieve is cooled in an exsiccator and weighed to the nearest 0.1 mg.

Thermal Conductivity

Several thermoanalytical methods allow the measurement of the thermal conductivity of a sample (solid, liquid or powder) as a function of temperature. Measurements can for example be carried out with a Netzsch TCT 416 thermal analysis instrument (Sample size: up to 5×5×35 mm, measuring range: 0.5-250 W/mK).

The thermal conductivity tester Netzsch TCT 416 is designed to measure the thermal conductivity of solids in the range of $\lambda$=0.5 to 250 $W \cdot m^{-1} \cdot K^{-1}$ with an accuracy of ±5%. Therefore, plastics with low conductivity, as well as highly conductive materials like graphites, metals and alloys may be tested with the Netzsch TCT 416. Thermal conductivity measurements may be carried out in the temperature range between 30 to 60° C. (mean test piece temperature).

The testing involves the following steps: Heat is fed to the lower front side of a rod shaped test piece via a heat block ($T_H$). The rod-shaped test piece is surrounded by a constant temperature $T_U$ ($T_U$<$T_H$). In general the heater block is set at a temperature $T_H$ of 60° C. and the surrounding block at 25° C. ($T_U$). The heat transfer to and from the test piece is assured by a conductive paste and by a load applied to the test piece (usually 25 N). When the equilibrium is reached (typically after 5-10 min for $\lambda$>100 $W \cdot m^{-1} \cdot K^{-1}$ and 15-20 min for A 20 $W \cdot m^{-1} \cdot K^{-1}$), the temperature $T_2$ of the lower end surface of rod shape of the test piece and the temperature $T_1$ of the upper end surface of the rod shape of the are measured by two thermocouples (type K, NiCr—Ni). The thermal conductivity (TC) may be calculated from the temperature $T_1$ and $T_2$, which depend both on the thermal conductivity of the test material and on the heat transfer coefficient between the test piece and its surroundings. The measured temperatures depend also on the geometric dimensions of the test piece. This test may be used on rods with circular cross section of 6 mm or with squared cross section of 5×5 mm. The length of the test piece depends on the TC of the material: 35 mm for $\lambda$>5 $W \cdot m^{-1} \cdot K^{-1}$ and 20 mm for $\lambda$<5 $W \cdot m^{-1} \cdot K^{-1}$. The end surfaces should be parallel and perpendicular to the sides as well as very smooth in order to provide good heat transfer.

Deviations in the dimensions of ±0.3 mm are acceptable before recalibration is necessary.

Measurement: The two thermostats are switched on 2 hours before starting the measurement ($T_H$=60° C., $T_U$=25° C.) in order to reach a steady state (difference in the temperatures below 0.1° C.). The measurement is carried out twice with the sample being overturned between the two measurements. The thermal conductivity is the median of the two values.

Calibration: The calibration of the TCT 416 is carried out on four different reference test pieces (see Table 1) with the two different lengths (20 and 35 mm) in order to determine the calibration factors. For every reference test piece the measurement is repeated three times and the median is used for the calibration. The calibration is repeated every year or after 20 measurements.

TABLE 1

Characteristic data of reference materials

| Material | $\lambda$ [W · m$^{-1}$ · K$^{-1}$] | Temperature [° C.] |
|---|---|---|
| Duralluminium | 129 ± 2.5 | 57 |
| Brass | 102 ± 2.0 | 56.5 |
| Steel 1.4104 (magnetic) | 21.8 ± 0.5 | 51 |
| Steel 1.4301 | 14.2 ± 0.3 | 48 |

Alternatively, thermal conductivity of the polymers is determined by a guarded heat flow meter method (ASTM E 1530), for example in an Anter Quickline™-10 instrument (sample size: disc Ø50 mm, up to 30 mm thickness, measuring range: 0.1-20 W/mK).

Thermal conductivity of the polymers can also be determined by Laserflash method (ASTM E-1461), for example in an LFA447 instrument from Netzsch.

Izod Impact Strength

The determination of unnotched Izod impact strength was measured in accordance with ISO 180:1993(E), using a using a Ceast 6545 Impact Tester, fitted with various pendulums of different energies (1, 2.75 and 5 J). The absorbed energy (J), impact strength (kJ/m2) and impact strength (J/m) of ten samples from each of the supplied specimens was measured. The absorbed energy (VV) should be between 10% and 80% of the pendulum energy (E), otherwise the pendulum must be changed. Always use a pendulum having the highest energy if possible.

Strain at Break

The determination of the tensile properties of the supplied samples was measured in accordance with BS 2782: Part 3: Method 320B, using a Tinius Olsen H10KS tensometer fitted with a 10KN load cell. The stress at yield (MPa), stress at break (MPa) and strain at break (%) of ten samples of each of the supplied specimens (type 1 test piece) were measured at a separation rate of 50 mm/min. Elongation was measured using a mechanical extensometer set to a gauge length of 70 mm.

It will be apparent to those of skill in the art that many modifications and slight variations are possible without departing from the spirit and scope of the present invention. Exemplary embodiments of the present invention will now be described by way of illustration only, with reference to the following examples.

EXAMPLES

Example 1

Agglomeration Process for Expanded Graphite

In order to prepare the ground expanded graphite agglomerates, the raw ground expanded graphite is fed to a couple of counter-rotating rolls with the help of a screw. By passing through the rolls the expanded graphite is pre-agglomerated. In this example, rolls having a smooth surface is employed (although the rolls can also have a structured surface in order to improve the production rate). In a second step, the fine agglomeration step, the pre-agglomerated expanded graphite is pushed with the help of rotating cleats through a final sieve or set of sieves which assist in defining the agglomerate size of the ground expanded graphite (see FIG. 15). The desired tap density is adjusted by the appropriate choice of the screw speed, the gap between the rolls, and the sieve size, producing the desired soft agglomerates of ground expanded graphite (Roller Compactor PP 150, manufactured by Alexanderwerk AG, Remscheid, Germany).

The influence of the roll gap parameter on the product characteristics (tap density, size distribution by vibrating sieve and water sieving as well as the BET surface area of the obtained agglomerates) is illustrated in the following table:

TABLE 2

Influence of roll gap on product characteristics

| | Roller Compactor Machine Parameter | | | | Material Parameter | | | |
|---|---|---|---|---|---|---|---|---|
| | feeding rate [rpm] | roll gap [mm] | roll pressure [kN/cm] | sieve size [mm] | tap density [g/cm$^3$] | vibrating sieve >250 μm [%] | water sieving >250 μm [%] | BET [m$^2$/g] |
| Material 1 | 8 | 0.15 | 5 | 2.5 | 0.35 | 83 | 18 | 22 |
| Material 2 | 8 | 0.25 | 5 | 2.5 | 0.22 | 50 | 0.06 | 20 |
| Material 3 | 8 | 0.35 | 5 | 2.5 | 0.16 | 48 | 0.01 | 22 |

Example 2

Alternative Agglomeration Process for Expanded Graphite

In an alternative setup, agglomerates of ground expanded graphite is made with a machine having a different geometrical arrangement. In this setup, the raw material is fed vertically to the counter-rotating rolls with the help of a vertical screw, as shown in FIG. 16 (Powtec RC210, manufactured by Powtec Maschinen and Engineering GmbH, Remscheid, Germany). The tap density is again adjusted through the screw speed, the roll gap and the final sieve size.

Example 3

Alternative Agglomeration Process for Expanded Graphite

Pin Mixer Pelletizing Process

In an alternative process, the agglomerates may be produced with a pin mixer pelletizer system as generally known in the art. Such pin mixer pelletizer systems are widely used, e.g., for agglomerating carbon black powders. The pin mixer consists of a cylindrical stationary shell with a rotating shaft provided with pins. The raw ground expanded graphite enters the system at one end of the cylinder and may be whipped by the rotating pins as it moves from the inlet, through the shell and to the bottom outlet. A fine spray of liquid or vapour may be added at the entry section and distributed throughout the powder, which leads to fine mixing and micro-agglomeration of the particles. In this example, the liquid or the vapour may be water, although in general any inert liquid may work in this setup. Also, additives can be added at this stage.

This method may require a second drying step in order to remove the moisture from the ground expanded graphite agglomerates. The bulk density of the agglomerates can be adjusted by the feeding rate, the moisture content, the type and amount of additives added and the pin shaft rotating speed.

Example 4

Alternative Agglomeration Process for Expanded Graphite

Rotary Drum Pelletizing Process

In this process, the agglomeration may be accomplished with a rotary drum pelletizer system, which in general is very similar to the pin mixer described in Example 4. Here the ground expanded graphite may be charged to the rotating cylinder equipped with pins, blades or cones, thereby pushing the material from the inlet of the drums to the outlet. A wetting liquid may be sprayed into the cylinder. An additional drying step may be then applied in order to remove the moisture from the agglomerates.

The bulk density of the ground expanded graphite agglomerates may be adjusted by the feeding rate, the moisture content, the choice and amount of additives added and the drum rotating speed.

Example 5

Alternative Agglomeration Process for Expanded Graphite

Fluidized Bed Agglomeration Process

Another alternative process for preparing the ground expanded graphite agglomerates may employ a fluidized bed chamber, for example as described in DE 199 04 657 A1 or DE 100 14 749 B4. The raw ground expanded graphite may be fed to the fluidized bed chamber inlet zone. Process air may be fed to all process stages from beneath the fluidized bed. Water and a binder may be introduced over the fluidized bed by spraying or by a jet stream. All ingredients may be fluidized to form homogenized granules of ground expanded graphite.

Example 6

Alternative Agglomeration Process for Expanded Graphite

Spray Dryer Agglomeration Process

In this process, the ground expanded graphite agglomerates may be prepared by spray drying. Spray drying apparatuses for preparing agglomerates of different powders have been described in several patents, e.g., CH 359 662, U.S. Pat. No. 7,449,030 B2, EP 0 469 725 B1 and JP 4 113 746 B2.

A water based dispersion containing the raw ground expanded graphite particles and, optionally, a binder may be atomized to form small droplets, and the liquid is evaporated by virtue of a gas stream, thereby agglomerating the graphite powder. The formed agglomerates may be collected on the bottom of the spray dryer apparatus and are subsequently dried in order to remove the remaining moisture.

Example 7

Alternative Agglomeration Process for Expanded Graphite

Fluidized Bed Spray Dryer Agglomeration Process

The Fluidised Bed Spray Dryer process to manufacture agglomerated expanded graphite consists in the combination of the two processes described above in Examples 6 and 7. A water based dispersion of raw ground expanded graphite (optionally containing additives like a binder) may be atomised as droplets centrally into the upper part of a drying chamber where a drying gas may be introduced to partially dry the droplets to moist particles and carry them in a downward widening direction to the bottom where a fluidized particle bed may be formed by means of an upward stream of fluidizing gas drying, classifying and agglomerating the particles therein.

The invention claimed is:

1. Graphite agglomerates comprising ground expanded graphite particles compacted together, wherein said agglomerates are in granular form having a size ranging from about 100 µm to about 10 mm.

2. The graphite agglomerates of claim 1, wherein said agglomerates are in granular form having a size ranging from about from about 200 µm to about 4 mm.

3. The graphite agglomerates of claim 1, wherein said agglomerates have a tap density ranging from about 0.08 to about 1.0 g/cm$^3$.

4. The graphite agglomerates of claim 1, wherein said agglomerates have a tap density ranging from about 0.08 to about 0.6 g/cm$^3$.

5. The graphite agglomerates of claim 1, wherein said agglomerates have a tap density ranging from about 0.12 to about 0.3 g/cm$^3$.

6. The graphite agglomerates of claim 1, wherein the ground expanded graphite particles have a mean particle size ($d_{50}$) ranging from about 5 µm to about 500 µm.

7. The graphite agglomerates of claim 1, wherein the ground expanded graphite particles have a mean particle size ($d_{50}$) ranging from about 20 µm to about 200 µm.

8. The graphite agglomerates of claim 1, wherein the ground expanded graphite particles have a mean particle size ($d_{50}$) ranging from about 30 µm to about 100 µm.

9. The graphite agglomerates of claim 1, wherein at least about 10 wt % of the agglomerates remain above a 250 µm Mesh sieve after soft vibrating sieving.

10. The graphite agglomerates of claim 1, wherein at least about 25 wt % of the agglomerates remain above a 250 μm Mesh sieve after soft vibrating sieving.

11. The graphite agglomerates of claim 1, wherein at least about 40 wt % of the agglomerates remain above a 250 μm Mesh sieve after soft vibrating sieving.

12. The graphite agglomerates of claim 1, wherein said agglomerates have a specific BET surface area ranging from about 8 m²/g to about 200 m²/g.

13. The graphite agglomerates of claim 1, wherein said agglomerates have a specific BET surface area ranging from about 15 m²/g to about 50 m²/g.

14. The graphite agglomerates of claim 1, wherein a conductive polymer including the graphite agglomerates has substantially the same thermal conductivity and mechanical properties as a polymer composite prepared with ground expanded graphite instead of the graphite agglomerates.

15. The graphite agglomerates of claim 1, wherein less than about 20% (w/w) of the agglomerates remaining on the 250 μm Mesh sieve after soft vibrating sieving remain on the sieve when subjected to mechanical water flushing sieving according to EN ISO 787-18:1983 (250 μm Mesh size, 10 minutes sieving time).

16. The graphite agglomerates of claim 1, wherein less than about 10% (w/w) of the agglomerates remaining on the 250 μm Mesh sieve after soft vibrating sieving remain on the sieve when subjected to mechanical water flushing sieving according to EN ISO 787-18:1983 (250 μm Mesh size, 10 minutes sieving time).

17. The graphite agglomerates of claim 1, wherein less than about 2% (w/w) of the agglomerates remaining on the 250 μm Mesh sieve after soft vibrating sieving remain on the sieve when subjected to mechanical water flushing sieving according to EN ISO 787-18:1983 (250 μm Mesh size, 10 minutes sieving time).

18. The graphite agglomerates of claim 1, wherein the maximum output of the ground expanded graphite agglomerates in a Brabender FlexWall DDW-MD5-FW40 Plus-50 gravimetric dosimeter is at least about 6 kg/h at a tap density of about 0.125 g/cm³ and at least about 12 kg/h at a tap density of about 0.25 g/cm³.

19. The graphite agglomerates of claim 1, wherein said agglomerates comprise at least one further component in particulate form, wherein the weight ratio of the ground expanded graphite to the at least one other component ranges from about 95:5 to about 5:95.

20. The graphite agglomerates of claim 19, wherein said further component is selected from the group consisting of natural graphite, synthetic graphite, carbon black, boron nitride, aluminium nitride, carbon fibers, carbon nanofibers, carbon nanotubes, graphene, coke, silver powders, copper powders, aluminium oxide powders, steel fibers, PAN, graphite fibers, silicon carbide, graphene, or combinations thereof.

21. A method for making ground expanded graphite agglomerates as defined in claim 1, comprising compacting ground expanded graphite particles together to form the ground expanded graphite agglomerates.

22. The method of claim 21, wherein the compacting comprises compacting the ground expanded graphite particles together with at least one further component in particulate form to yield ground expanded graphite agglomerates, wherein the weight ratio of the ground expanded graphite to the at least one other component ranges from about 95:5 to about 5:95.

23. The method of claim 22, wherein said further component is selected from the group consisting of natural graphite, synthetic graphite, carbon black, boron nitride, aluminium nitride, carbon fibers, carbon nanofibers, carbon nanotubes, graphene, coke, silver powders, copper powders, aluminium oxide powders, steel fibers, PAN, graphite fibers, silicon carbide, graphene, or combinations thereof.

24. The method of claim 21, wherein agglomeration is accomplished by a process selected from the group consisting of:
  i) employing a roller compactor, wherein the tap density is adjusted by virtue of the feeding rate, the roll gap and the sieve size,
    wherein the ground expanded graphite particles are fed with the help of a screw to a couple of counter-rotating rolls to yield a pre-agglomerate, followed by a fine agglomeration step whereby the pre-agglomerates are pushed through a sieve which assists in defining the desired agglomerate size;
  ii) employing a flat die pelletizer, wherein the tap density is adjusted by the gap between the rolls, the die and die size, and the knives speed,
    wherein the ground expanded graphite particles are pressed through a die by pan grinder rolls, followed by cutting the pre-agglomerated graphite particles to the desired size with suitable means such as rotating knives;
  iii) employing a pin mixer pelletizer or a rotary drum pelletizer, wherein the tap density is adjusted by the feeding rate, the moisture content, the choice and concentration of the additives and the pin shaft or drum rotating speed, respectively;
  iv) a fluidized bed process;
  v) a spray dryer process; or
  vi) a fluidized bed spray dryer process.

25. The method of claim 21, wherein the method further comprises grinding an expanded graphite material to form ground expanded graphite particles.

26. The method of claim 21, wherein the expanded graphite is made by:
  intercalating a graphite material; and
  thermally expanding the graphite material to form an expanded graphite material.

27. A conductive composite comprising the graphite agglomerates of claim 1.

28. A conductive polymer comprising:
  an expanded graphite material chosen from the group consisting of:
    ground expanded graphite agglomerates as defined in claim 1; and
    compacted expanded graphite particles; and
  a polymer matrix.

29. The conductive polymer of claim 28, wherein the polymer matrix is formed by a polyolefin, a polyamide, a polyester, an acrylic or acetate, a polyimide, a thio/ether polymer, an elastomer, a thermoplastic elastomer, thermosetting resins, copolymers thereof, or mixtures of any of the foregoing materials.

30. A method for making the conductive polymer as defined in claim 28, comprising feeding the ground expanded graphite agglomerates to an extruder, thereby mixing the polymer and agglomerates, followed by moulding of the resulting conductive polymer into the desired form.

31. A thermally and/or electrically conductive material comprising the conductive polymer of claim 28.

* * * * *